(12) United States Patent
Yang

(10) Patent No.: US 9,972,285 B2
(45) Date of Patent: *May 15, 2018

(54) DEVICE AND METHOD FOR CONTROLLING ELECTRONIC MAP

(71) Applicant: BEIJING QIHOO TECHNOLOGY COMPANY LIMITED, Beijing (CN)

(72) Inventor: Xinming Yang, Beijing (CN)

(73) Assignee: BEIJING QIHOO TECHNOLOGY COMPANY LIMITED (CN)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/666,245

(22) Filed: Aug. 1, 2017

(65) Prior Publication Data
US 2017/0330532 A1    Nov. 16, 2017

Related U.S. Application Data

(63) Continuation of application No. 15/108,969, filed as application No. PCT/CN2014/087173 on Sep. 23, 2014, now Pat. No. 9,728,167.

(30) Foreign Application Priority Data

Dec. 30, 2013  (CN) .......................... 2013 1 0744408
Dec. 30, 2013  (CN) .......................... 2013 1 0745517
(Continued)

(51) Int. Cl.
*G06T 17/05* (2011.01)
*G09G 5/373* (2006.01)
(Continued)

(52) U.S. Cl.
CPC ........... *G09G 5/373* (2013.01); *G06F 3/0485* (2013.01); *G06F 17/3028* (2013.01);
(Continued)

(58) Field of Classification Search
CPC ....................................................... G06T 3/40
See application file for complete search history.

(56) References Cited

U.S. PATENT DOCUMENTS 9,036,509 B1 *   5/2015   Addepalli ............. H04W 4/046
                                                          370/259
2007/0080830 A1 *   4/2007   Sacks ...................... G06F 3/147
                                                          340/995.1
(Continued)

FOREIGN PATENT DOCUMENTS

CN         102819530         12/2012
CN         102880440          1/2013
(Continued)

*Primary Examiner* — Phi Hoang
(74) *Attorney, Agent, or Firm* — Clark Hill PLC; James R. Foley

(57) ABSTRACT

The present invention discloses a device and method for controlling zooming-in of an electronic map, a device and method for controlling zooming-out of an electronic map, a device and method for controlling panning of an electronic map, a device and method for computing tiles within a visual region of an electronic map, and a device and method for processing an electronic map tile request queue, wherein the method for controlling zooming-in of an electronic map comprises: determining a target display level to be reached via zooming in when receiving an instruction of zooming in the map, and searching out a plurality of target tiles that need to be displayed in the target display level; selecting a pre-loaded display level based on a relationship between a current display level and the target display level, and searching out pre-loaded tiles corresponding to the target tiles in the pre-loaded display level; acquiring the pre-loaded tiles and the target tiles according to an order of priority, loading and displaying the pre-loaded tiles by zooming in according to a level difference between the pre-loaded display level and the target display level; and after acquiring the target (Continued)

tiles, loading and displaying the target tiles so as to replace the zoomed-in pre-loaded tiles at corresponding positions.

15 Claims, 6 Drawing Sheets

(30) Foreign Application Priority Data

Dec. 30, 2013 (CN) .......................... 2013 1 0745527
Dec. 30, 2013 (CN) .......................... 2013 1 0745782
Dec. 30, 2013 (CN) .......................... 2013 1 0746249

(51) Int. Cl.
*G06F 17/30* (2006.01)
*G06F 3/0485* (2013.01)
*G09G 5/38* (2006.01)

(52) U.S. Cl.
CPC ......... *G06F 17/30241* (2013.01); *G09G 5/38* (2013.01); *G06F 2203/04804* (2013.01); *G06F 2203/04806* (2013.01); *G09G 2360/121* (2013.01); *G09G 2360/122* (2013.01); *G09G 2370/022* (2013.01)

(56) References Cited

U.S. PATENT DOCUMENTS

| 2009/0027418 A1* | 1/2009 | Maru ................ G06F 17/30241 345/629 |
| 2013/0124563 A1 | 5/2013 | CaveLie et al. |
| 2013/0147842 A1* | 6/2013 | Zhu ........................ G09G 5/373 345/636 |
| 2013/0147846 A1 | 6/2013 | Kalai et al. |
| 2015/0156609 A1* | 6/2015 | Davis .................... H04W 4/021 455/457 |

FOREIGN PATENT DOCUMENTS

| CN | 103699439 | 4/2014 |
| CN | 103699670 | 4/2014 |
| CN | 103700125 | 4/2014 |
| CN | 103700126 | 4/2014 |
| CN | 103714164 | 4/2014 |

\* cited by examiner

DEVICE AND METHOD FOR CONTROLLING ELECTRONIC MAP

RELATED APPLICATION (PRIORITY CLAIM)

This application is a continuation of U.S. patent application Ser. No. 15/108,969, filed Jun. 29, 2016, which is a 371 of International Application No. PCT/CN2014/087173, filed Sep. 23, 2014.

FIELD OF THE INVENTION

The present invention relates to the technical field of electronic maps, and more specifically relates to a device and method for controlling zooming-in of an electronic map, a device and method for controlling zooming-out of an electronic map, a device and method for controlling panning of an electronic map, a device and method for computing tiles within a visual region of an electronic map, and a device and method for processing an electronic map tile request queue.

BACKGROUND OF THE INVENTION

Currently, when an electronic map client is zoomed in according to a map zooming-in instruction from a user (c.f., electronic map web clients such as Baidu Map, Google Map, Tencent Map, etc.; it is seen that in the technical field of electronic maps, zooming-in a map means presenting a smaller geographic scope and a more specific map detail within the same electronic map display scope when clicking onto a zoom-in button, i.e., "+" button), lower-level tiles different from the current display level need to be loaded. Due to needs of requesting tiles from a server and performing processing like image rendering to the tiles, more time is needed when zooming in the electronic map, such that some tiles cannot be displayed in time, and blank will exist in the electronic map window; when the network performance is not ideal, the blank in the electronic map will become more apparent. Besides, switching between electronic map levels is very conspicuous. The same problem also arises when zooming-out or panning the map according to an instruction from a user.

SUMMARY OF THE INVENTION

In view of the above problems, the present invention is presented to provide a device and method for controlling zooming-in of an electronic map, a device and method for controlling zooming-out of an electronic map, a device and method for controlling panning of an electronic map, a device and method for computing tiles within a visual region of an electronic map, and a device and method for processing an electronic map tile request queue, so as to overcome or at least partially solve the above problems.

According to one aspect of the present invention, there is provided a device for controlling zooming-in of an electronic map, the device comprising: a target tile computing unit configured to determine a target display level to be reached via zooming in when receiving an instruction of zooming in a map, and search out a plurality of target tiles that need to be displayed in the target display level, wherein a current display level is higher than the target display level; a pre-loaded tile computing unit configured to select a pre-loaded display level based on a relationship between the current display level and the target display level, and search out pre-loaded tiles corresponding to the target tiles in the pre-loaded display level; a loading unit configured to acquire the pre-loaded tiles and the target tiles according to an order of priority, load and display the pre-loaded tiles by zooming in according to a level difference between the pre-loaded display level and the target display level; and after acquiring the target tiles, load and display the target tiles so as to replace the zoomed-in pre-loaded tiles at corresponding positions.

According to another aspect of the present invention, there is provided a device for controlling zooming-out of an electronic map, the device comprising: a target tile computing unit configured to determine a target display level to be reached via zooming out when receiving an instruction of zooming out a map, and search out a plurality of target tiles that need to be displayed in a target display level, wherein the target display level is higher than a current display level; a first loading unit configured to load and display the currently displayed tiles by zooming out according to a level difference between the current display level and the target display level; a pre-loaded tile computing unit configured to select a pre-loaded display level and search out pre-loaded tiles that need to be loaded at an edge region in the pre-loaded display level; a second loading unit configured to acquire the pre-loaded tiles and the target tiles in an order of priority, load and display the pre-loaded tiles by zooming in according to a level difference between the pre-loaded display level and the target display level; and after acquiring the target tiles, load and display the target tiles so as to replace the zoomed-out currently displayed tiles and zoomed-in pre-loaded tiles at corresponding positions.

According to a further aspect of the present invention, there is provided a device for controlling panning of an electronic map, the device comprising: a target tile computing unit configured to search out a plurality of target tiles that need to be loaded and displayed when receiving an instruction of panning a map; a pre-loaded tile computing unit configured to select a pre-loaded display level based on a current display level, and search out pre-loaded tiles corresponding to the target tiles in the pre-loaded display level; a loading unit configured to acquire the pre-loaded tiles and the target tiles according to an order of priority, and load and display the pre-loaded tiles by zooming in according to a level difference between the pre-loaded display level and the current display level; and after acquiring the target tiles, load and display the target tiles so as to replace the zoomed-in pre-loaded tiles at corresponding positions.

According to a still further aspect of the present invention, there is provided a device for computing tiles within a visual region of an electronic map, the device comprising: a fixed-point computing unit configured to according to geographical position coordinates of a central point of the visual region of the map and a current display level of the map, obtain pixel coordinates of the central point by converting; a tile analyzing unit configured to according to the current display level of the map, obtain a pixel size of a single tile in the current display level; an apex analyzing unit configured to obtain pixel coordinates of two opposite apexes of the visual region of the map according to a pixel size of a visual region of the map and the pixel coordinate of the central point; and a tile computing unit configured to obtain serial numbers of the tiles within the visual region according to the pixel coordinates of two opposite apexes of the visual region of the map and the pixel size of a single tile in the current display level.

According to another aspect of the present invention, there is provided a device for processing an electronic map tile request queue, the device comprising: a tile selecting unit configured to determine a to-be-downloaded target level tile request and a pre-loaded level tile request according to a received electronic map interaction instruction; a queue managing unit configured to add the target level tile request and the pre-loaded level tile request into the electronic map tile request queue and process them prior to other tile requests in the queue.

According to another aspect of the present invention, there is provided a method for controlling zooming-in of an electronic map, the method comprising: determining a target display level to be reached via zooming in when receiving an instruction of zooming in a map, and searching out a plurality of target tiles that need to be displayed in the target display level; selecting a pre-loaded display level based on a relationship between a current display level and the target display level, and searching out pre-loaded tiles corresponding to the target tiles in the pre-loaded display level; acquiring the pre-loaded tiles and the target tiles according to an order of priority, and loading and displaying the pre-loaded tiles by zooming in according to a level difference between the pre-loaded display level and the target display level; and after acquiring the target tiles, loading and displaying the target tiles so as to replace the zoomed-in pre-loaded tiles at corresponding positions.

According to another aspect of the present invention, there is provided a method for controlling zooming-out of an electronic map, the method comprising: determining a target display level to be reached via zooming out when receiving an instruction of zooming out a map, and searching out a plurality of target tiles that need to be displayed in the target display level, wherein the target display level is higher than a current display level; loading and displaying currently displayed tiles by zooming out according to a level difference between the current display level and the target display level; selecting a pre-loaded display level and searching out pre-loaded tiles that need to be loaded at an edge region in the pre-loaded display level; acquiring the pre-loaded tiles and the target tiles in an order of priority, and loading and displaying the pre-loaded tiles by zooming in according to a level difference between the pre-loaded display level and the target display level; and after acquiring the target tiles, loading and displaying the target tiles so as to replace the zoomed-out currently displayed tiles and zoomed-in pre-loaded tiles at corresponding positions.

According to a further aspect of the present invention, there is provided a method for controlling panning of an electronic map, the method comprising: searching out a plurality of target tiles that need to be loaded and displayed when receiving an instruction of panning a map; selecting a pre-loaded display level based on a current display level, and searching out pre-loaded tiles corresponding to the target tiles in the pre-loaded display level; acquiring the pre-loaded tiles and the target tiles according to an order of priority, and loading and displaying the pre-loaded tiles by zooming in according to a level difference between the pre-loaded display level and the current display level; and after acquiring the target tiles, loading and displaying the target tiles so as to replace the zoomed-in pre-loaded tiles at corresponding positions.

According to a still further aspect of the present invention, there is provided a method for computing tiles within a visual region of an electronic map, the method comprising: according to geographical position coordinates of a central point of the visual region of the map and a current display level of the map, obtaining pixel coordinates of the central point by converting; obtaining a pixel size of a single tile in the current display level according to the current display level of the map; according to the pixel size of the visual region of the map and the pixel coordinates of the central point, obtaining pixel coordinates of two opposite apexes of the visual region of the map; and obtaining serial numbers of tiles in the visual region according to the pixel coordinates of two opposite apexes of the visual region of the map and the pixel size of the a single tile in the current display level.

According to another aspect of the present invention, there is provided a method for processing an electronic map tile request queue, the method comprising: determining a to-be-downloaded target level tile request and a pre-loaded level tile request according to a received electronic map interaction instruction; adding the target level tile request and the pre-loaded level tile request into the electronic map tile request queue and process them prior to other tile requests in the queue.

The device for controlling zooming-in of an electronic map and the method for controlling zooming-in of an electronic map according to the present invention may quickly display fussy pre-loaded tiles by selecting a pre-loaded display level and loading and displaying the pre-loaded tiles by zooming in, thereby solving the problems in the prior art that many blanks will appear in the electronic map window because much time is needed when zooming-in an electronic map such that some tiles cannot be displayed in time, thereby achieving an effect of reducing the probability of occurrence of blanks in the electronic map window when zooming in the electronic map. By loading the pre-loaded tiles and displaying the fussy pre-loaded tiles by zooming in, and loading and displaying the target tiles after acquiring the target tiles so as to replace the zoomed-in pre-loaded tiles at corresponding positions, switching between map levels is made inconspicuous. Likewise, when zooming out or panning the electronic map, the switching between map levels is also made inconspicuous.

The depiction above is only a summary of the technical solutions of the present invention. Preferred embodiments of the present invention are specifically provided below with a purpose of making the technical means of the present invention much clearer so as to be implemented according to the content of the specification, and with a purpose of making the above and other objectives, features, and advantages of the present invention more apparent and comprehensible.

BRIEF DESCRIPTION OF THE DRAWINGS

Various other advantages and benefits will become clear and apparent to a person of normal skill in the art through reading detailed depiction of the preferred embodiments below. The accompanying drawings are only for the purpose of illustrating preferred embodiments, and should not be deemed as a limitation to the present invention. Moreover, in the accompanying drawings, the same reference numerals represent the same components. In the accompanying drawings.

DETAILED DESCRIPTION OF THE PREFERRED EMBODIMENTS

Figure 1:
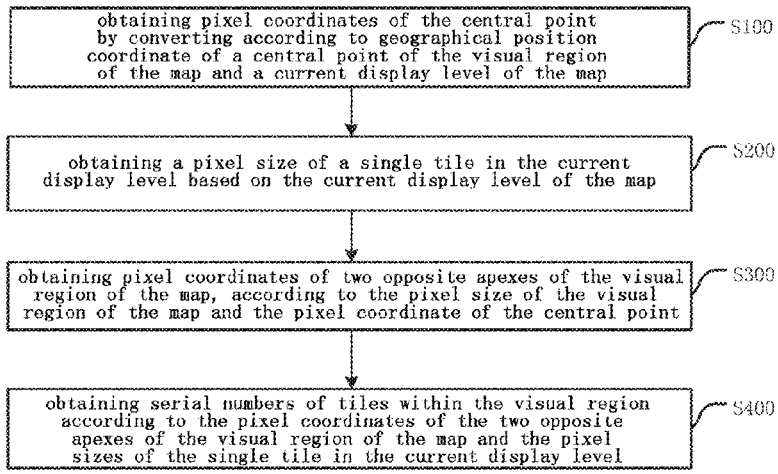
FIG. 1 illustrates a flow diagram of a method for computing tiles in a visual region of an electronic map according to a first embodiment of the present invention.

Hereinafter, exemplary embodiments of the present disclosure will be described in more detail with reference to the accompanying drawings. Although the drawings reveal the exemplary embodiments of the present disclosure, it should be understood that the present disclosure may be implemented in various manners and should not be limited by the embodiments illustrated here. On the contrary, these embodiments are provided for enabling thorough understanding of the present disclosure and complete conveying of the scope of the present disclosure to those skilled in the art.

A technical concept of the present invention mainly lies in determining a target display level and a pre-loaded display level when receiving an instruction of zooming in or zooming out a map, while determining a pre-loaded display level when receiving an instruction of panning the map, so as to search out target tiles that need to be displayed and pre-loaded tiles corresponding to the target tiles (i.e., map scopes represented thereby are corresponding). Because the number of pre-loaded tiles is less than that of the target tiles (e.g., a map scope represented by one piece of pre-loaded tile corresponds to a map scope represented by four or sixteen or more pieces of tiles of a lower level), the time taken by a server to download pre-loaded tiles and load the pre-loaded tile is shorter than the time taken by the server to download target tiles and load the target tiles in the prior art. By loading the pre-loaded tiles and displaying the fussy pre-loaded tiles by zooming in and by, after obtaining the target tiles, loading and displaying the target tiles to replace the zoomed-in pre-loaded tiles at corresponding positions, the probability of appearance of blanks in the electronic map window is reduced upon zooming in, zooming out, and panning the map. By loading the pre-loaded tiles and displaying fussy pre-loaded tiles by zooming in, and after obtaining the target tiles, by loading and displaying the target tiles to replace the zoomed-in preloaded tiles at corresponding positions, the electronic map reveals a displaying process from fussiness to clarity, such that the switching between map levels is inconspicuous.

It should be noted that the electronic map tiles, i.e., pictures in a grid map, are pieced together into a complete electronic map according to a certain rule; tiles of lower levels will be displayed by zooming in the electronic map. In the art, the map scope represented by a single tile in a higher level is larger than the map scope represented by a single tile in a lower level. For example, a piece of tile of a higher level in an adjacent level is equivalent to a map scope represented by four tiles of a lower level; in two levels with a level difference of 2, the tile of the higher level is equivalent to a map scope represented by 16 tiles of the lower level.

Before detailed depiction of the solutions of controlling zooming-in, zooming-out, and panning of the electronic map, the present application first illustrates in detail a solution of computing tiles within a visual region of an electronic map and a solution of processing an electronic map tile request queue.

FIG. 1 illustrates a flow diagram of a method of computing tiles within a visual region of an electronic map according to a first embodiment of the present invention. The method comprises step S100-step S400 below:

S100: according to geographical position coordinates of a central point of the visual region of the map and a current display level of the map, obtaining pixel coordinates of the central point by converting. In the present embodiment, the geographical position coordinates of a central point of the visual region of the map refer to altitude-latitude coordinates or coordinates derived by projecting the altitude-latitude coordinates onto a plane map through a projection algorithm; the pixel coordinates of the central point (e.g., X-Y coordinates) can be derived by converting according to the geographical position coordinates and the current display level of the map.

S200: obtaining a pixel size of a single tile in the current display level based on the current display level of the map. Preferably, in the present embodiment, in order to present the information on the map more specifically and thoroughly, a hierarchical tile mechanism is employed to save an electronic map; the map is divided into a plurality of levels to save, where corresponding grid map tiles are deposited at each level. With tiles under two adjacent display levels as an example, 4 adjacent tiles (i.e., 2×2 "⊞"-shaped 4 adjacent tiles) under a lower display level correspond to one tile under a higher display level; with two levels of tiles with a level difference of 2 as an example, 16 adjacent tiles (i.e., 4×4=16 adjacent tiles) under a display level of a lower display level correspond to one tile of a display level of the higher display level. Therefore, pixel sizes of a single tile under different levels are different. According to a current display level of the map, a pixel size (e.g., pixel width and pixel height) of a single tile in the current display level can be obtained.

S300: according to the pixel size of the visual region of the map and the pixel coordinates of the central point, obtaining pixel coordinates of two opposite apexes of the visual region of the map. In the present embodiment, suppose the visual region of the map is square and the pixel size is fixed. Of course, even if the pixel size of the visual region is variable, those skilled in the art may also obtain the pixel size of the visual region by detecting. In the present embodiment, two opposite apexes of the visual region of the map include a left upper apex and a right lower apex of the visual region of the map, or the right upper apex and the left lower apex of the visual region of the map; the scope of the visual region of the map can be uniquely determined through two opposite apexes.

S400: obtaining serial numbers of the tiles within the visual region according to the pixel coordinates of two opposite apexes of the visual region of the map and the pixel size of the single tile in the current display level.

According to a projection principle, overlapping points in two maps before and after the zooming represent a same geographical position. In the present embodiment, a point with an unchanged geographical position before and after zooming the map is defined as a zooming focal center; according to geographical position coordinates (i.e., altitude-latitude coordinate) of the zooming focal center and the target display level after the map zooming, the pixel coordinates (e.g., X-Y coordinate) of the zooming focal center can be obtained. The zooming focal center of the present embodiment can be a mouse position when receiving a map zooming instruction inputted by a user through a mouse wheel, or can be a map center when receiving a map zooming instruction inputted by the user through a page button (e.g., "+," "−" buttons). By computing the serial numbers of the tiles within the visual region after map zooming based on the zooming focal center, the computing procedure can be simplified, and the computation amount can be reduced.

Therefore, the method according to the present embodiment further comprises the following steps so as to compute the serial numbers of tiles in a visual region after map zooming: upon receiving a map zooming instruction, obtaining the pixel coordinates of the zooming focal center by converting according to the geographical position coordinates of the zooming focal center of the map and the target display level after the map is zoomed; obtaining pixel sizes of a single tile in the target display level based on the target display level; obtaining pixel coordinates of two opposite apexes of the visual region after map zooming based on the pixel size of the visual region of the map and the pixel coordinates of the zooming focal center; and obtaining serial numbers of the tiles within the visual region after map zooming based on pixel coordinates of two opposite apexes of the visual region after map zooming and the pixel size of the a single tile under the target display level.

Step 400 in FIG. 1 specifically comprises step S401 and step S402 (not shown in the figure) provided below:

S401: obtaining transverse index numbers and longitudinal index numbers of tiles where the two opposite apexes are located. Specifically, for the two opposite apexes, the pixel coordinates of the apexes are minus by the pixel coordinates of the origin of the map, respectively, to obtain transverse coordinate (e.g., X-coordinate in the X-Y coordinates) difference and longitudinal coordinate (e.g., Y-coordinate in the X-Y coordinates) difference, respectively; further, the transverse coordinate difference is divided by pixel width of a single tile to obtain the transverse index number; the longitudinal coordinate difference is divided by pixel height of the single tile to obtain the longitudinal index number.

S402: selecting transverse index numbers (including the transverse index numbers of the tiles where the two opposite apexes are located) between the transverse index numbers of the tiles where the two opposite apexes are located and longitudinal index numbers between the longitudinal index numbers of the tiles where two opposite apexes are located (including the longitudinal index numbers of the tiles where two opposite apexes are located), to obtain the serial numbers of the tiles within the visual region of the map. Through the step 402, serial numbers of tiles in a square visual region are obtained.

A method for computing a visual region of an electronic map according to a second embodiment of the present invention comprises step S100'-S500' (not shown), wherein step S100'-step S400' are identical to step S100-S400 in the first embodiment, respectively, which will not be detailed here.

Step S500': computing serial numbers of pre-loaded tiles corresponding to the visual region in at least one pre-loaded level according to the geographical position coordinates of the central point of the visual region of the map and the pre-loaded level. The pre-loaded level refers to at least one level whose level difference with the current display level is within a set range. For example, suppose the current display level is level 10. If the set range is at most 3 levels higher than the current display level and at most 2 levels lower than the current display level, the pre-loaded levels include level 9, level 8, and level 7, which are higher than level 10; and level 11 and level 12, which are lower than level 10.

Step S500' specifically comprises step S501'-step S504' (not shown) provided below:

S501': according to the geographical position coordinates of the central point of the visual region of the map and the pre-loaded levels, obtaining the pixel coordinates of the central point by converting. In the present embodiment, the geographical position coordinates of the central point of the visual region of the map are altitude-latitude coordinates or coordinates derived by projecting the altitude-latitude coordinates onto a planar map through a projection algorithm; through the geographical position coordinates and the pre-loaded level, pixel coordinates (e.g., X-Y coordinates) of the central point at the pre-loaded display level can be obtained by converting.

S502': obtaining a pixel size of a single tile in the pre-loaded level based on the pre-loaded level of the map. According to the pre-loaded level of the map, the pixel size (e.g., a pixel width and a pixel height) of a single tile in the pre-loaded level can be obtained.

S503': obtaining pixel coordinates of two opposite apexes of the visual region of the map based on the pixel size of the visual region of the map and the pixel coordinates of the central point. The two opposite apexes of the visual region of the map include a left upper apex and a right lower apex of the visual region of the map, or the right upper apex and the left lower apex of the visual region of the map; through the two opposite apexes, the scope of the visual region of the map can be uniquely determined.

S504': obtaining the serial numbers of the pre-loaded tiles corresponding to the visual region in the pre-loaded level according to the pixel coordinates of two opposite apexes of the visual region of the map and the pixel size of the single tile in the pre-loaded level. The specific method for implementing the step S504' is similar to steps S401 and S402 as mentioned above, which will not be detailed here.

Further, the step S500' above also comprises an operation of obtaining the serial numbers of tiles surrounding the pre-loaded tiles under the pre-loaded level based on the obtained serial number of the pre-loaded tile, specifically, by appropriately extending the obtained transverse index numbers and longitudinal index numbers.

A method for computing tiles within a visual region of an electronic map according to a third embodiment of the present invention comprises steps S100"-step S500" (not shown), wherein step S100"-step S400" are identical to steps S100-S400 in the first embodiment, respectively, which will not be detailed here.

Step 500": performing a division and rounding operation or a multiplication operation to the serial numbers of the tiles within a visual region of the map under the current display level according to a level difference between the pre-loaded level and the current display level; and computing the serial numbers of the pre-loaded tiles corresponding to the tiles within a visual region in the at least one pre-loaded level. The preloaded level refers to at least one level whose level difference from the current display level is within a set range.

Specifically, the performing a division and rounding operation or a multiplication operation to the serial numbers of the tiles within a visual region of the map under the current display level according to a level difference between the pre-loaded level and the current display level in the step S500" comprises: if the pre-loaded level is higher than the current display level, dividing the transverse index numbers and the longitudinal index numbers of the tiles within the visual region of the map under the current display level by m and performing rounding. Those skilled in the art can understand that the specific rounding algorithm may be selected based on the index number of a slicing origin point of the tiles; if the index number of the slicing origin point of the tiles is zero, rounding downward is enough (similar to a floor function); otherwise, rounding upward (similar to a ceiling function), wherein $m=2^k$, and k is a natural number, indicating a level difference between the pre-loaded level and the current display level. If the pre-loaded level is lower than the current display level, the transverse index numbers and the longitudinal index numbers of the tiles within the visual region of the map under the current display level are multiplied by p, obtaining p neighboring index numbers according to a multiplication operation result. The specific method corresponds to the above rounding algorithm, wherein $p=2^q$ and, q is a natural number, indicating a level difference between the current level and the pre-loaded level. Compared with step S500' of the second embodiment, the step S500" in the third embodiment reduces the operation complexity while ensuring a correct rate.

Further, the step S500" further comprises an operation of obtaining serial numbers of tiles surrounding the pre-loaded tiles under the pre-loaded level according to the obtained serial numbers of the pre-loaded tiles, specifically by appropriately extending the transverse index number and the longitudinal index number as obtained to an appropriate extension.

It should be noted that if the pre-loaded level is higher than the current display level, the geographical area corresponding to the respective pre-loaded tiles is larger than the geographical area corresponding to the respective target tiles and is n times of the geographical area corresponding to the respective target tiles, $n=4^k$, and k is a natural number, indicating a level difference between the pre-loaded display level and the target level. If the pre-loaded level is lower than the current display level, the geographical area corresponding to respective pre-loaded tiles is less than the geographical area corresponding to respective target tiles and is 1/r of the geographical area corresponding to the respective target tiles, wherein $r=4^q$, and q is a natural number, indicating a level difference between the current display level and the pre-loaded level.

In conjunction with the following disclosure about loading and displaying an electronic map, it is seen that the technical effect achieved by computing the serial numbers of the pre-loaded tiles in step S500' of the second embodiment and step S500" of the third embodiment of the present invention is specifically a technical effect of reducing the probability of occurrence of blanks existing in the electronic display window when zooming out, zooming in or panning the electronic map at the electronic map client.

Figure 2:
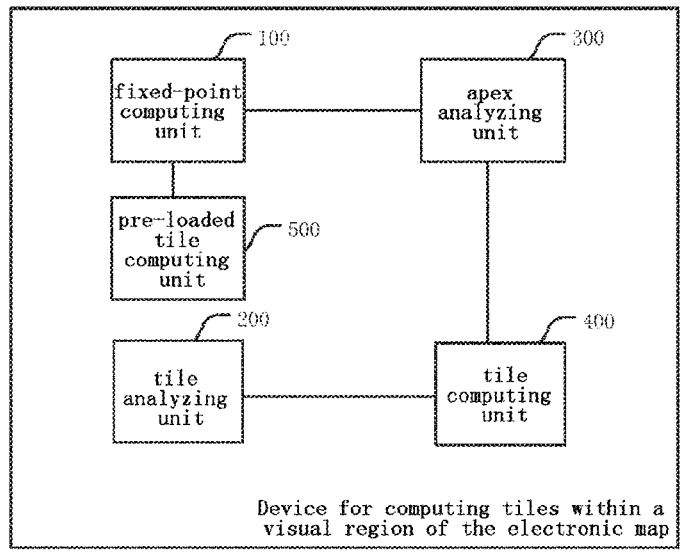
FIG. 2 illustrates a block diagram of a device for computing tiles in a visual region of an electronic map according to an embodiment of the present invention.

FIG. 2 illustrates a block diagram of a device for computing tiles in a visual region of an electronic map according to an embodiment of the present invention. The device comprises a fixed-point computing unit 100, a tile analyzing unit 200, an apex analyzing unit 300, and a tile computing unit 400.

The fixed-point computing unit 100 configured to, according to geographical position coordinates of a central point of the visual region of the map and a current display level of the map, obtain pixel coordinates of the central point by converting. In the present embodiment, the geographical position coordinates of the central point of the visual region of the map are altitude-latitude coordinates or coordinates derived by projecting the altitude-latitude coordinates onto a planar map through a projection algorithm; the fixed-point computing unit 100 can derive the pixel coordinates of the central point (e.g., X-Y coordinates) by converting according to the geographical position coordinates and the current display level of the map.

The tile analyzing unit 200 configured to obtain a pixel size of a single tile in the current display level by converting based on the current display level of the map. In the present embodiment, the pixel size of a single tile is different under different levels. The tile analyzing unit 200 may obtain the pixel size (e.g., pixel width and pixel height) of a single tile in the current display level according to a current display level of the map.

The apex analyzing unit 300 configured to obtain, according to the pixel size of the visual region of the map and the pixel coordinates of the central point, pixel coordinates of two opposite apexes of the visual region of the map. In the present embodiment, two opposite apexes of the visual region of the map include a left upper apex and a right lower apex of the visual region of the map, or the right upper apex and the left lower apex of the visual region of the map; the scope of the visual region of the map can be uniquely determined through two opposite apexes.

The tile computing unit 400 configured to obtain serial numbers of the tiles within the visual region according to the pixel coordinates of two opposite apexes of the visual region of the map and the pixel size of the single tile in the current display level.

The apex analyzing unit 300 according to the present embodiment configured to obtain transverse index numbers and longitudinal index numbers of the tiles where the two opposite apexes are located; a tile computing unit 400 configured to select transverse index numbers between the transverse index numbers of the tiles where the two opposite apexes are located, and longitudinal index numbers between the longitudinal index numbers of the tiles where the two opposite apexes are located, thereby obtaining the serial numbers of the tiles within the visual region of the map.

Preferably, the device according to the present embodiment further comprises a pre-loaded tile computing unit 500.

The pre-loaded tile computing unit 500 configured to compute serial numbers of pre-loaded tiles in the pre-loaded level, wherein the pre-loaded level refers to at least one level whose level difference from the current display level is within a set range. The pre-loaded tile computing unit 500 in the present embodiment has two preferred embodiments.

The first preferred embodiment is computing serial numbers of pre-loaded tiles corresponding to the visual region of the map in at least one pre-loaded level according to the geographical position coordinates of the central point of the visual region of the map and the pre-loaded level.

The second preferred embodiment of the pre-loaded tile computing unit 500 according to the present embodiment is performing a division and rounding operation or a multiplication operation to the serial numbers within the visual region of the map under the current display level based on difference between the pre-loaded level and the current display level, and to compute the serial numbers of the pre-loaded tiles corresponding to the tiles within the visual region in at least one pre-loaded level.

Figure 3:
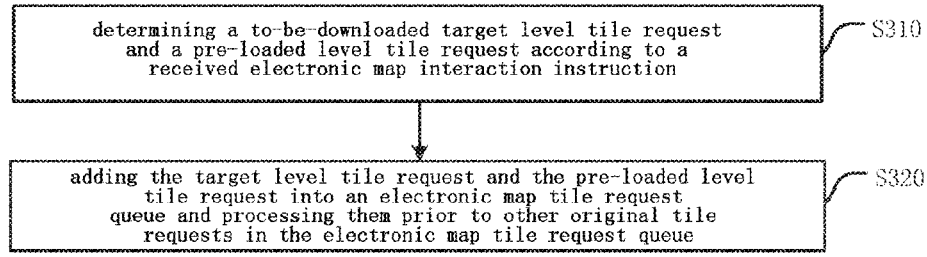
FIG. 3 illustrates a flow diagram of a method for processing an electronic map tile request queue according to a first embodiment of the present invention.

FIG. 3 illustrates a flow diagram of a method for processing an electronic map tile request queue according to a first embodiment of the present invention. The method comprises steps S310 and S320 as follows:

S310: determining a to-be-downloaded target level tile request and a pre-loaded level tile request according to a received electronic map interaction instruction.

Wherein, those skilled in the art can understand that the target display level can be determined based on an electronic map interaction instruction inputted by the user. In other words, the target display level refers to the display level of the electronic map after the operation is completed. In the present field, tiles of a lower level will be displayed by zooming in the map; the map scope represented by tiles of a higher level is greater than the map scope represented by tiles of a lower level. Therefore, if the electronic map interaction instruction indicates zooming in the electronic map, the target display level is lower than the current display level; if the electronic map interaction instruction indicates zooming out the electronic map, the target display level will be higher than the current display level; if the electronic map interaction instruction indicates panning the electronic map, the target display level is equal to the current display level. The target tiles refer to the tiles that need to be displayed in the map display region after responding to the electronic map interaction instruction. The method for determining a display level of to-be-downloaded target tiles will not be detailed here.

In the present embodiment, the method for determining a to-be-downloaded pre-loaded level tile request comprises: selecting a pre-loaded display level based on the target display level, and searching out a pre-loaded level tile corresponding to the target tile level. The pre-loaded display level is higher than the target display level. The map scope represented by the pre-loaded level tile includes the map scope represented by a plurality of target tiles, and the geographical area corresponding to respective pre-loaded tiles is n times of the geographical area corresponding to respective target tiles, $n=4^k$, k is a natural number and indicating a level difference between the pre-loaded display level and the target display level.

In the present embodiment, the method for searching pre-loaded tiles may be obtaining serial numbers of the pre-loaded tiles by a division and rounding operation using a correspondence relationship with the target tiles according to the serial numbers of the target tiles. In the present embodiment, because each pre-loaded level tile corresponds to a plurality of target tiles, the map scope represented by the pre-loaded level tile is possibly larger than the map scope represented by multiple target tiles.

S320: adding the target level tile request and the pre-loaded level tile request into the electronic map tile request queue and processing them prior to other tile requests in the queue.

Preferably, in the present embodiment, a pre-loaded level tile request is processed through a preset thread, while the target level tile request is processed through preset other threads; processing of the pre-loaded level tile request may be parallel to the processing of the target level tile request, or the pre-loaded level tile request may be processed in priority.

The specific implementation method of step S320 of the present embodiment may be managing an electronic map tile request queue using a first in first out (FIFO) algorithm, or setting a priority level to a request, or allocating a thread to a newly added request in priority.

In the present embodiment, a target level tile request newly added in the electronic map tile request queue and a pre-loaded level tile request can be processed in priority, which reduces the probability of existence of blanks in the electronic map window caused by multiple inputs of electronic map interaction instructions by the user within a short time.

Preferably, if the electronic map interaction instruction is an electronic map zooming-in instruction, the target level tile request and the pre-loaded level tile request are added in the electronic map tile request queue. Specifically, the requests for downloading pre-loaded tiles from a server are added in a tile request queue according to an ascending order of the distances from the pre-loaded tiles to the zooming focal center of the map, and the requests for downloading target tiles from the server are added in the tile request queue according to an ascending order of the distances from the target tiles to the zooming focal center of the map. The zooming focal point of the present embodiment can be a position of a mouse when receiving a map zooming-in instruction inputted by the user through a mouse wheel, or can be a center of the map when receiving a map zooming-in instruction inputted by the user through a page button (e.g., "+" button of Baidu Map or Tencent Map). By adding the requests for downloading the pre-loaded tiles from the server in the tile request queue in an ascending order of the distances to the zooming focal center of the map, tiles nearby the zooming focal center can be requested in priority.

Further, the following depiction in conjunction with loading and displaying the electronic map may help understanding the technical effect of reducing the probability of blanks existing in the electronic map window implemented by the operation of determining a request for to-be-downloaded pre-loaded level tile request in step S310 and the operation of adding the pre-loaded level tile request into the electronic map tile request queue in step S320 of the present invention.

In the present embodiment, by adding the target level tile request and the pre-loaded level tile request into the electronic map tile request queue, target tiles and pre-loaded tiles can be obtained from the server.

For the obtained pre-loaded tiles, the pre-loaded tiles are loaded and zoomed in according to the level difference between the pre-loaded display level and the target display level. By first displaying fussy zoomed-in pre-loading tiles, the loading speed is accelerated, and the probability of displaying blank tiles on the electronic map is reduced.

The method for processing an electronic map tile request queue according to a second embodiment of the present invention comprises steps S310', S320', and S330'. Step S310' is identical to step S310 in FIG. 3; step S330' is identical to step S330 in FIG. 1, which will not be detailed here. Different from the first embodiment, the second embodiment further comprises a step S320':

S320': cancelling part or all of requests in the tile request queue. By cancelling part or all of the requests in the tile request queue, a length of the request queue is maintained.

By cancelling useless requests in the tile request queue, even the user constantly move or zoom the map in a low network speed environment, the length of the tile request queue can still be avoided from being too long, solving the issue of too heave system load and difficulty in obtaining the required tiles due to a too long picture quest queue possibly caused by constantly panning or zooming the map by the user in a low network speed environment.

In the present embodiment, cancelling part or all of the requests in the tile request queue specifically comprises: setting a source attribute (src) of part or all of the requests in the tile request queue as a cached file. In other words, by setting the src of the tile (image) request to a cached picture, a request emitted to the server can be aborted.

Optionally, the step S320' further comprises: when canceling part or all of the requests in the tile request queue, determining whether to compulsorily clear a request that is being executed; if yes, compulsorily clearing the request that is being executed; if not, interrupting the request that is being executed and cancelling the request that is being executed when detecting that the number of requests in the tile request queue reaches a maximum value. In other words, when clearing the request queue, it is needed to determine whether to compulsorily clear a tile request that has been loaded half-way; in the case of not compulsorily clearing, interrupting these unfinished but canceled requests; and these requests are only canceled when detecting that the tile request queue exceeds a largest concurrent number, which avoids waste of traffic; of course, those skilled in the art may understand that when it is detected that the length of the tile request queue is smaller than a predetermined value, the interrupted request will be restored.

Optionally, cancelling part of requests in the tile request queue comprises: cancelling the part of requests which earlier added into the tile request queue according to a time sequence of adding the tile request queue.

Figure 4:
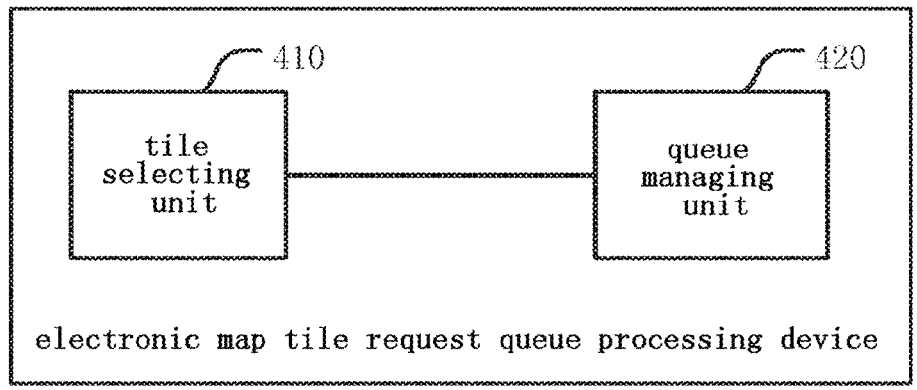
FIG. 4 illustrates a block diagram of a device for processing an electronic map tile request queue according to an embodiment of the present invention.

FIG. 4 illustrates a block diagram of a device for processing an electronic map tile request queue according to an embodiment of the present invention. The device comprises a target tile selecting unit 410 and a queue managing unit 420.

The tile selecting unit 410 is configured to determine a to-be-downloaded target level tile request and a pre-loaded level tile request according to a received electronic map interaction instruction.

In the present embodiment, the tile selecting unit 410 configured to select a pre-loaded display level based on the target display level to search out pre-loaded tiles corresponding to the target tiles in the pre-loaded display level.

A queue managing unit 420 configured to add the target level tile request and the pre-loaded level tile request into the electronic map tile request queue and process them prior to other tile requests in the queue.

Preferably, the queue managing unit 420 of the present embodiment configured to process a pre-loaded level tile request through a preset thread, and process a target level tile request through preset other threads; the queue managing unit 420 may concurrently process the pre-loaded level tile request and the target level tile request or process the pre-loaded level tile request in priority.

The queue managing unit 420 according to the present embodiment may use an FIFO (first-in first-out) algorithm to manage an electronic map tile request queue, or set a priority level to the request, or assign a thread to the newly added request in priority.

Preferably, if the electronic map interaction instruction is an electronic map zooming-in instruction, the queue managing unit 420 adds the requests for downloading pre-loaded tiles from the server in a tile request queue according to an ascending order of the distances from the pre-loaded tiles to the zooming focal center of the map, and adds the requests for downloading target tiles from the server in the tile request queue according to an ascending order of the distances from the target tiles to the zooming focal center of the map.

The queue managing unit 420 according to the present embodiment further configured to cancel part or all of the requests before adding the target level tile request and the pre-loaded level tile request into the tile request queue.

The queue managing unit 420 according to the present embodiment further configured to set source attributes of part or all of the requests in the tile request queue as already cached files, thereby cancelling the part or all of the requests in the tile request queue.

The queue managing unit 420 in the present embodiment configured to determine whether to compulsorily clear a request that is being executed when canceling part or all of the requests in the tile request queue; if yes, compulsorily clear the request that is being executed; if not, interrupt the request that is being executed and cancel the request that is being executed when detecting that the number of requests in the tile request queue reaches a maximum value.

The queue managing unit 420 according to the present embodiment configured to cancel the part of requests which earlier added into the tile request queue according to a time sequence of adding the tile request queue.

Figure 5:
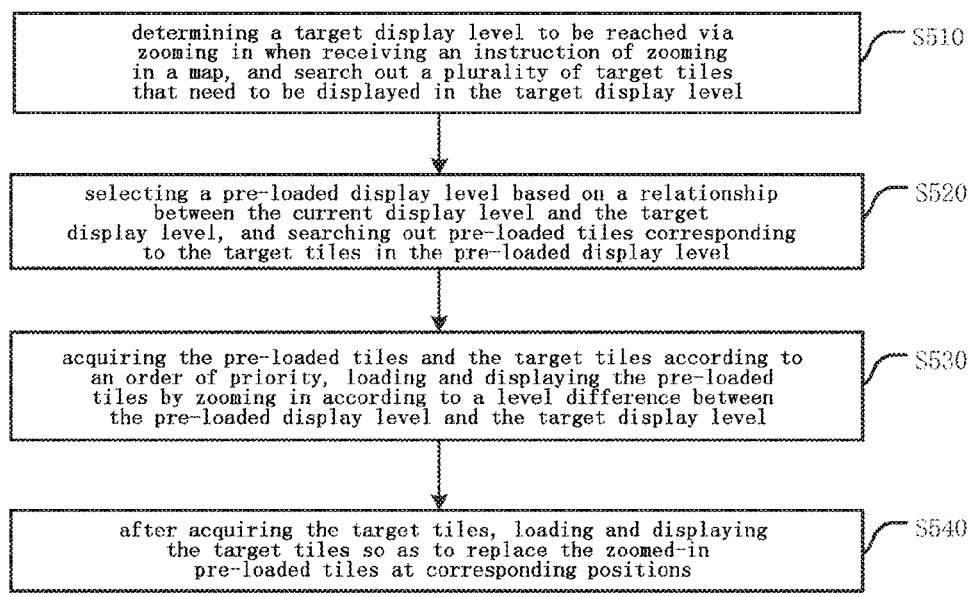
FIG. 5 illustrates a flow diagram of a method for controlling zooming-in of an electronic map according to an embodiment of the present invention.

FIG. 5 illustrates a flow diagram of a method for controlling zooming-in of an electronic map according to an embodiment of the present invention. The method comprises steps S510-S540 as follows:

S510: determining a target display level to be reached via zooming in when receiving an instruction of zooming in a map, and searching out a plurality of target tiles that need to be displayed in the target display level. Wherein, those skilled in the art can understand that the target display level is determined based on a map zooming-in instruction inputted by the user. In other words, the target display level is a display level of the electronic map after the operation is completed. In the field, tiles of a lower level will be displayed by zooming in a map, while the map scope represented by tiles of a higher level is larger than the map scope represented by tiles of a lower level. Therefore, the target display level is lower than the current display level. The method of searching target tiles may refer to the method illustrated in FIG. 1, where the target tiles are computed based on the geographical position coordinates of the central point of the visual region of the map and the target display level.

S520: selecting a pre-loaded display level based on a relationship between the current display level and the target display level, and searching out pre-loaded tiles corresponding to the target tiles in the pre-loaded display level.

In the present embodiment, the pre-loaded display level is higher than the target display level. Further, the pre-loaded display level is irrelevant to the current display level. The map scope represented by a pre-loaded tile includes map scopes represented by multiple target tiles, and the geographical area corresponding to respective pre-loaded tiles is n times of the geographical area corresponding to respective target tiles, $n=4^k$, k is a natural number and indicating a level difference between the pre-loaded display level and the target display level.

Preferably, in the present embodiment, in order to present information on the map more specifically and thoroughly, a hierarchical tile mechanism is employed to save an electronic map; the map is divided into a plurality of levels to save, where corresponding grid map tiles are deposited under respective levels. With tiles under two adjacent display levels as an example, 4 adjacent tiles (i.e., 2×2 "田"-shaped 4 adjacent tiles) under a lower display level corresponds to one tile under a higher display level; with two levels of tiles with a level difference of 2 as an example, 16 adjacent tiles (i.e., 4×4=16 adjacent tiles) under a display level of a lower display level correspond to one tile of a display level of the higher display level. In the present embodiment, the method of searching a pre-loaded tile may be a method referring to the method illustrated in FIG. 1., i.e., computing pre-loaded tiles according to the geographic position coordinates of the central point of the visual region of the map and the pre-loaded display level, or may be obtaining serial numbers of the pre-loaded tiles by a division and rounding operation using a correspondence relationship with the target tiles according to the serial numbers of the target tiles. In the present embodiment, because each pre-loaded tile corresponds to a plurality of target tiles, the map scope represented by a pre-loaded tile is possibly greater than the map scope represented by multiple target tiles.

S530: acquiring the pre-loaded tiles and the target tiles according to an order of priority, loading and displaying the pre-loaded tiles by zooming in according to a level difference between the pre-loaded display level and the target display level. By first displaying fussy zoomed-in pre-loaded tiles, the load speed is accelerated, while the probability of displaying blank tiles on the electronic map is reduced.

In the present embodiment, loading and displaying the pre-loaded tiles by zooming in according to a level difference between the pre-loaded display level and the target display level comprising: displaying transverse widths and longitudinal heights of respective pre-loaded tiles by zooming in m times, wherein $m=2^k$, k is a natural number, indicating a level difference between the pre-loaded display level and the target display level. In other words, if the level difference between the pre-loaded display level and the target display level is 1, the transverse widths and the longitudinal heights of respective pre-loaded tiles are displayed by zooming in 2 times; if the level difference between the pre-loaded display level and the target display level is 2, the transverse widths and the longitudinal heights of respective pre-loaded tiles are displayed by zooming in 4 times.

S540: after acquiring the target tiles, loading and displaying the target tiles so as to replace the zoomed-in preloaded tiles at corresponding positions. By replacing corresponding fussy pre-loaded tiles with clear target tiles, clearly displaying the map is achieved, and a map display effect from fussiness to clarity is achieved.

By integrating steps S510, S520, S530, and S540, through selecting a pre-loaded display level and loading and displaying the pre-loaded tiles by zooming in, the present embodiment quickly displays fussy pre-loaded tiles and reduces the probability of displaying blank tiles in the electronic map.

By performing steps S520 and step S530, the present embodiment can select a pre-loaded display level higher than the target display level and displaying the zoomed-in pre-loaded tiles in the pre-loaded display level; preferably, the pre-loaded display level is not higher than the current display level. By repetitively performing step S520 and step S530, a plurality of pre-loaded display levels higher than the target display level can also be selected and the zoomed-in pre-loaded tiles in the plurality of pre-loaded display levels may be displayed. In specific implementations, zoomed-in pre-loaded tiles in higher pre-loaded display levels may be first displayed, and then zoomed-in pre-loaded tiles in lower pre-loaded display levels are displayed, which can likely achieve the display effect from fussiness to clarity. In addition, those skilled in the art should understand that the pre-loaded display levels may also be a current display level.

Further, the method further comprises: setting a local cache; saving displayed tiles in the local cache. More specifically, the present embodiment controls tile request frequency by creating a local cache. When zooming in a map, cached tiles can be displayed in priority, which reduces the probability for the user to see blanks; and the loading speed may be accelerated using the cache. In the case that a server end does not provide a cache head, repetitive request of tiles can also be avoided. The method of the present embodiment also comprises: when saving the displayed tiles in the local cache, if capacity of the local cache is not enough, removing the least recently used tiles from the local cache. In other words, cache is implemented by a LRU (least recently used) policy; when the tiles in the cache exceed the capacity set by the cache, the least recently used tiles will be eliminated in priority.

Preferably, the method of selecting a pre-loaded display level in step S520 includes selecting a plurality of levels higher than the target display level, and selecting a pre-loaded display level from the various levels; specifically, judging that tiles corresponding to the target tiles in various levels are in the cache or need to be downloaded from the server, and selecting a level with a least number of tiles that need to be downloaded from the server as the pre-loaded display level, thereby accelerating the speed of downloading the pre-loaded tiles from the server; further, if the numbers of tiles that need to be downloaded from the server are identical, a higher level is selected in priority as the pre-loaded display level, thereby reducing the number of pre-loaded tiles that need to be processed so as to further accelerate the processing speed.

In the present embodiment, acquiring the pre-loaded tiles and the target tiles according to an order of priority in step S530 above specifically comprises: judging whether the pre-loaded tiles and the target tiles are in the local cache; if yes, reading the pre-loaded tiles and the target tiles from the local cache; if not, downloading the pre-loaded tiles and the target tiles from the server. By acquiring the tiles in the cache in priority, the loading speed can be enhanced.

Downloading the pre-loaded tiles and the target tiles from the server specifically comprises: adding the requests for downloading pre-loaded tiles from the server in a tile request queue according to an ascending order of the distances from the pre-loaded tiles to the zooming focal center of the map, and adding the requests for downloading target tiles from the server in the tile request queue according to an ascending order of the distances from the target tiles to the zooming focal center of the map. The zooming focal point of the present embodiment can be a position of a mouse when receiving a map zooming-in instruction inputted by a user through a mouse wheel, or can be a center of the map when receiving a map zooming-in instruction inputted by the user through a page button (e.g., "+" button of Baidu Map or Tencent Map). By adding the requests for downloading the pre-loaded tiles from the server in the tile request queue in an ascending order of the distances to the zooming focal center of the map, tiles nearby the zooming focal center can be loaded in priority.

Figure 6:
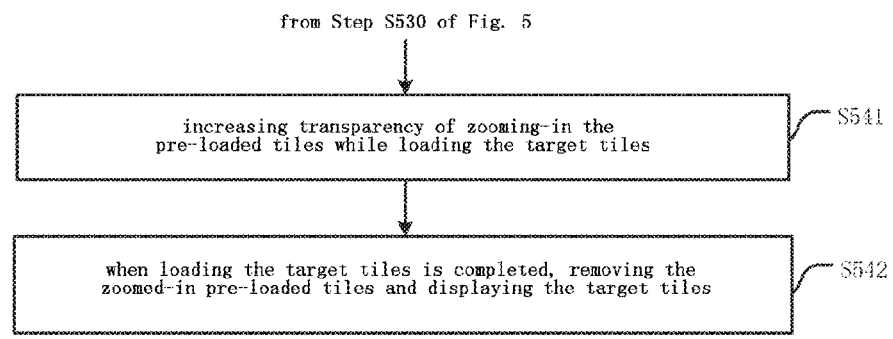
FIG. 6 illustrates a detailed flow diagram of step S400 of FIG. 5.

FIG. 6 illustrates a detailed flow diagram of step S540 in FIG. 5. Loading and displaying the target tiles to replace the zoomed-in pre-loaded tiles at corresponding positions in step S540 specifically comprises steps of:

S541: increasing transparency of zooming in the pre-loaded tiles while loading the target tiles. In other words, when loading the target tiles, the zoomed-in pre-loaded tiles gradually become transparent.

S542: when loading the target tiles is completed, removing the zoomed-in pre-loaded tiles and displaying the target tiles. Specifically, when a plurality of target tiles corresponding to one zoomed-in pre-loaded tiles are completely loaded, the zoomed-in pre-loaded tiles are removed, while the plurality of completely loaded target tiles are displayed; therefore, the electronic map becomes clearer.

In the present embodiment, different rendering mechanisms are provided based on different browser versions to enhance rendering performance of the tiles, so as to guarantee the smoothness of the operation in step S530 of loading and displaying the pre-loaded tiles by zooming-in and the operation in step S540 of loading and displaying the target tiles in step S540. For example, for a browser that supports a webgl interface, a WebglRenderer rendering mechanism is provided; for a browser that supports HTML5 tag Canvas, a CanvasRenderer rendering mechanism is provided; for a CSS3-enabled browser, a CSSRenderer rendering mechanism is provided; for lower-version browsers such as IE6, IE7, and IE8, a FlashRenderer rendering mechanism is provided; for all browsers, DivRenderer rendering mechanism is provided.

Figure 7:
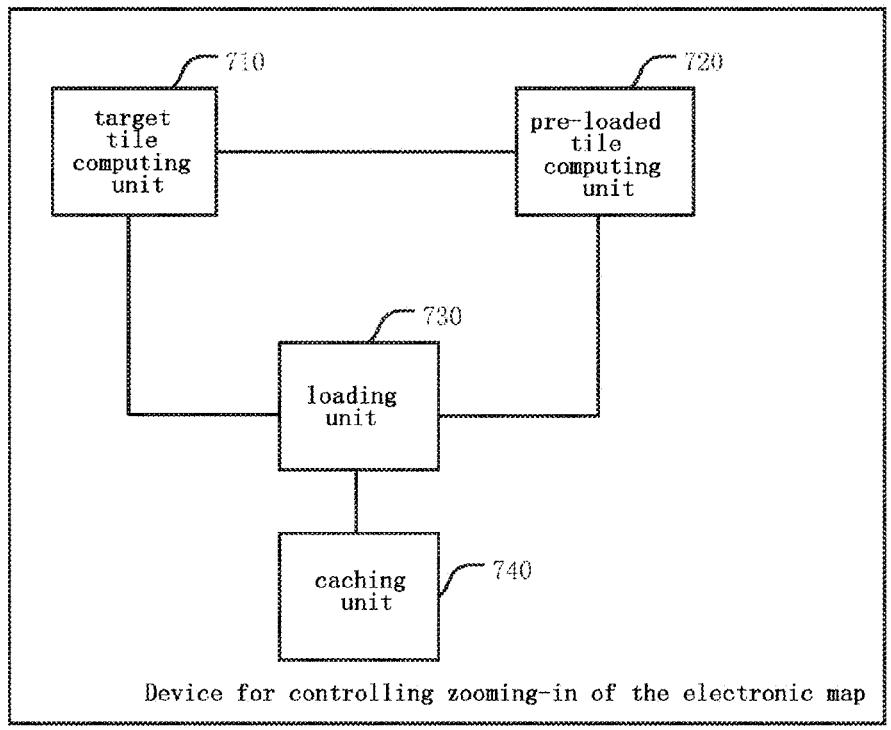
FIG. 7 illustrates a block diagram of a device for zooming in an electronic map according to an embodiment of the present invention.

FIG. 7 illustrates a block diagram of a device for zooming in an electronic map according to an embodiment of the present invention. The device comprises a target tile computing unit 710, a pre-loaded tile computing unit 720, and a loading unit 730.

The target tile computing unit 710 configured to determine a target display level to be reached via zooming in when receiving an instruction of zooming in a map, and search out a plurality of target tiles that need to be displayed in the target display level.

The pre-loaded tile computing unit 720 configured to select a pre-loaded display level based on a relationship between the current display level and the target display level, and search out pre-loaded tiles corresponding to the target tiles in the pre-loaded display level.

In the present embodiment, the pre-loaded tile computing unit 720 configured to select a pre-loaded display level higher than the target display level; a map scope represented by the pre-loaded tiles include a map scope represented by a plurality of target tiles; moreover, the geographical region represented by the pre-loaded tiles is n times of the geographical region corresponding to the respective target tiles, $n=4^k$, k is a natural number, indicating a level difference between the pre-loaded display level and the target display level.

The loading unit 730 configured to acquire the pre-loaded tiles and the target tiles according to an order of priority, load and display the pre-loaded tiles by zooming in according to a level difference between the pre-loaded display level and the target display level; and after acquiring the target tiles, load and display the target tiles so as to replace the zoomed-in preloaded tiles at corresponding positions.

In the present embodiment, the loading unit 730 configured to display transverse width and longitudinal height of respective pre-loaded tiles by zooming in m times, wherein $m=2^k$, k is a natural number, indicating a level difference between the pre-loaded display level and the target display level.

In the present embodiment, the loading unit 730 configured to add the requests for downloading pre-loaded tiles from the server in a tile request queue according to an ascending order of the distances from the pre-loaded tiles to the zooming focal center of the map, and add the requests for downloading target tiles from the server in the tile request queue according to an ascending order of the distances from the target tiles to the zooming focal center of the map.

In the present embodiment, the loading unit 730 configured to increase transparency of zooming-in the pre-loaded tiles while loading the target tiles; when loading the target tiles is completed, remove the zoomed-in pre-loaded tiles and display the target tiles.

In the present embodiment, the target tile computing unit 710 configured to obtain pixel coordinates of a zoomed-in central point by converting according to geographical position coordinates of the zoomed-in central point of the visual region of the map and the target display level of the map; obtain a pixel size of a single target tile that needs to be displayed based on the target display level of the map; obtain pixel coordinates of two opposite apexes of the visual region of the map according to a pixel size of the visual region of the map and the pixel coordinates of the zoomed-in central point; and obtain the target tiles within the visual region according to the pixel coordinates of two opposite apexes of the visual region of the map and the pixel size of the single target tile that needs to be displayed.

Preferably, the device according to the present embodiment further comprises a caching unit 740.

The caching unit 740 configured to set a local cache; and save displayed tiles in the local cache. A local cache is created by the caching unit 740 to control tile request frequency. When zooming in a map, cached tiles can be displayed in priority, which reduces the probability for the user to see blanks; and the loading speed may be accelerated using the cache. In the case that the server end does not provide a cache head, repetitive request of tiles can also be avoided.

Further, when the displayed tiles are saved by the caching unit 740 in the local cache, if capacity of the local cache is not enough, the caching unit 740 removes the least recently used tiles from the local cache.

Further, the loading unit 730 of the present embodiment configured to judge whether the pre-loaded tiles and the target tiles are in the local cache; if yes, read the pre-loaded tiles and the target tiles from the local cache; if not, download the pre-loaded tiles and the target tiles from the server. By acquiring the tiles in the cache in priority, the loading speed can be enhanced.

Figure 8:
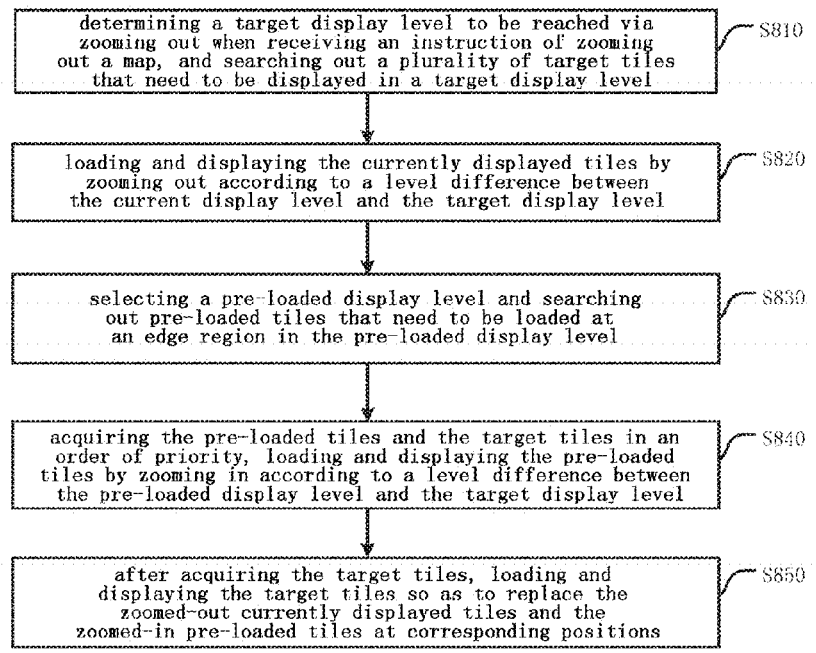
FIG. 8 illustrates a flow diagram of a method for controlling zooming-out of an electronic map according to an embodiment of the present invention.

FIG. 8 illustrates a flow diagram of a method for controlling zooming-out of an electronic map according to an embodiment of the present invention. The method comprises steps S810-S840:

S810: determining a target display level to be reached via zooming out when receiving an instruction of zooming out a map, and searching out a plurality of target tiles that need to be displayed in a target display level, wherein the target display level is higher than a current display level. Wherein, those skilled in the art can understand that the target display level is determined based on a map zooming-out instruction inputted by a user. In other words, the target display level is a display level of the electronic map after the operation is completed. In the field, tiles of a higher level will be displayed by zooming out a map, while the map scope represented by tiles of a higher level is larger than the map scope represented by tiles of a lower level. Therefore, the target display level is higher than the current display level. The method of searching a target tile may refer to the method illustrated in FIG. 2, where the target tile is computed based on the geographical position coordinates of the central point of the visual region of the map and the target display level. A zoomed-out electronic map can be obtained by displaying the target tiles.

S820: loading and displaying a currently displayed tile by zooming out according to a level difference between the current display level and the target display level.

Specifically, loading and displaying the currently displayed tile by zooming out according to a level difference between the current display level and the target display level comprises: displaying a transverse width and a longitudinal height of the currently displayed tile by zooming out to 1/p, wherein $p=2^q$, q is a natural number, indicating a level difference between the target display level and the current display level. If the level difference between the target display level and the current display level is 1, the transverse height and longitudinal height of the currently displayed tile are displayed by zooming-out to ½; if the level difference between the target display level and the current display level is 2, the transverse height and the longitudinal height of the currently displayed tile are displayed by zooming-out to ¼, so on and so forth.

In the present embodiment, by displaying the currently displayed tile by zooming-out, a part of region of the zoomed-out map can be quickly displayed in fussiness, and the surrounding map scope is displayed quickly with a lower definition through steps S830 and S840 below.

S830: selecting a pre-loaded display level and searching out pre-loaded tiles that need to be loaded at an edge region in the pre-loaded display level.

In the present embodiment, the pre-loaded display level is higher than the target display level. The map scope represented by the pre-loaded tiles covers a map scope represented by a plurality of target tiles other than the map scope represented by the currently displayed tile, i.e., a zoomed-out complete map scope that needs to be displayed in the display region minus the zoomed-out map scope represented by the current display tile in step S820, or the "edge region" indicated above; besides, the geographical area corresponding to respective pre-loaded tiles is n times of the geographical area corresponding to respective target tiles, $n=4^k$, k is a natural number, indicating a level difference between the pre-loaded display level and the target display level.

Preferably, in the present embodiment, in order to present information on the map more specifically and thoroughly, a hierarchical tile mechanism is employed to save an electronic map; the map is divided into a plurality of levels to save, where corresponding grid map tiles are deposited under respective levels. With tiles under two adjacent display levels as an example, 4 adjacent tiles (i.e., 2×2 "田"-shaped 4 adjacent tiles) under a lower display level corresponds to one tile under a higher display level; with two levels of tiles with a level difference of 2 as an example, 16 adjacent tiles (i.e., 4×4=16 adjacent tiles) under a display level of a lower display level correspond to one tile of a display level of the higher display level. In the present embodiment, the method of searching pre-loaded tiles may refer to the method illustrated in FIG. 1. In the present embodiment, i.e., computing pre-loaded tiles according to geographic position coordinates of the central point of the visual region of the map and the pre-loaded display level, or obtaining serial numbers of the pre-loaded tiles by a division and rounding operation based on a correspondence relationship with the target tile according to the serial numbers of the target tiles. In the present embodiment, because each pre-loaded tile corresponds to a plurality of target tiles, the map scope represented by the pre-loaded tiles is possibly greater than the map scope represented by multiple target tiles.

S840: acquiring the pre-loaded tiles and the target tiles in an order of priority, loading and displaying the pre-loaded tiles by zooming in according to a level difference between the pre-loaded display level and the target display level. By first displaying fussy zoomed-in pre-loaded tiles, the loading speed is accelerated, and the probability of displaying blank tiles on the electronic map is reduced.

In the present embodiment, the pre-loaded tiles are loaded and displayed by zooming in according to a level difference between the pre-loaded display level and the target display level, comprising: displaying a transverse width and a longitudinal height of respective pre-loaded tiles by zooming in m times, wherein $m=2^k$, k is a natural number, indicating a level difference between the pre-loaded display level and the target display level. In other words, if the level difference between the pre-loaded display level and the target display level is 1, the transverse width and the longitudinal height of respective pre-loaded tiles are displayed by zooming in 2 times; if the level difference between the pre-loaded display level and the target display level is 2, the transverse width and the longitudinal height of respective pre-loaded tiles are displayed by zooming in 4 times.

S850: after acquiring the target tiles, loading and displaying the target tiles so as to replace the zoomed-out currently displayed tiles and the zoomed-in pre-loaded tiles at corresponding positions. By replacing the zoomed-out currently displayed tiles and zoomed-in pre-loaded tiles at corresponding positions with clear target tiles, the map is clearly displayed, and a display effect of displaying the map from fussiness to clarity is achieved.

By integrating steps S810, S820, S830, S840 and S850, through loading and displaying the currently displayed tiles by zooming out, selecting a pre-loaded display level, and loading and displaying the pre-loaded tiles by zooming in, the present embodiment quickly displays fussy pre-loaded tiles with a lower definition and reduces the probability of displaying blank tiles in the electronic map.

By performing steps S830 and step S840, the present embodiment can select a pre-loaded display level higher than the target display level and display the zoomed-in pre-loaded tiles in the pre-loaded display level. By repetitively performing step S830 and step S840, it is also enabled to select a plurality of pre-loaded display levels higher than the target display level, and display the zoomed-in pre-loaded tiles in the plurality of pre-loaded display levels. In specific implementations, zoomed-in pre-loaded tiles in higher pre-loaded display levels may be first displayed, and then zoomed in pre-loaded tiles in lower pre-loaded display levels are displayed, which can likewise achieve the display effect from fussiness to definition. In addition, those skilled in the art should understand that the pre-loaded display level can also be a current display level.

Further, the method further comprises a step of setting a local cache and a step of saving the displayed tiles in the local cache, as indicated above. More specifically, the method of the present embodiment further comprises: when saving the displayed tiles in the local cache, if capacity of the local cache is not enough, removing the least recently used tiles from the local cache. Preferably, the method of selecting a pre-loaded display level in step S830 comprises selecting a plurality of levels higher than the target display level, and selecting a pre-loaded display level from the various levels; specifically, judging that the pre-loaded tiles in various levels are in the cache or need to be downloaded from the server, and selecting a level with a least number of tiles that need to be downloaded from the server as the pre-loaded display level, thereby accelerating the speed of downloading the pre-loaded tiles from the server; further, if the numbers of tiles that need to be downloaded from the server are identical, a higher level is selected in priority as the pre-loaded display level, thereby reducing the number of pre-loaded tiles that need to be processed so as to further accelerate the processing speed.

In the present embodiment, acquiring the pre-loaded tiles and the target tiles according to an order of priority in step S840 above specifically comprises: judging whether the pre-loaded tiles and the target tiles are in the local cache; if yes, reading the pre-loaded tiles and the target tiles from the local cache; if not, downloading the pre-loaded tiles and the target tiles from the server. By acquiring the tiles in the cache in priority, the loading speed can be enhanced.

Step S850 of the present embodiment specifically comprises steps of:

S851: increasing transparency of zoomed-out currently displayed tiles and zoomed-in pre-loaded tiles while loading the target tiles. In other words, when loading the target tiles, the zoomed-out currently displayed tiles and zoomed-in pre-loaded tiles gradually become transparent.

S852: when loading the target tiles is completed, removing the zoomed-out currently displayed tiles and zoomed-in pre-loaded tiles and displaying the target tiles. Specifically, when a plurality of target tiles corresponding to one zoomed-out currently displayed tile and one zoomed-in pre-loaded tile are completely loaded, the zoomed-out currently displayed tiles or zoomed-in pre-loaded tiles are removed, while the plurality of completely loaded target tiles are displayed; therefore, the electronic map becomes clearer.

In the present embodiment, different rendering mechanisms are provided based on different browser versions. The preferred rendering mechanisms as provided refer to the detailed depiction of FIG. 4.

Figure 9:
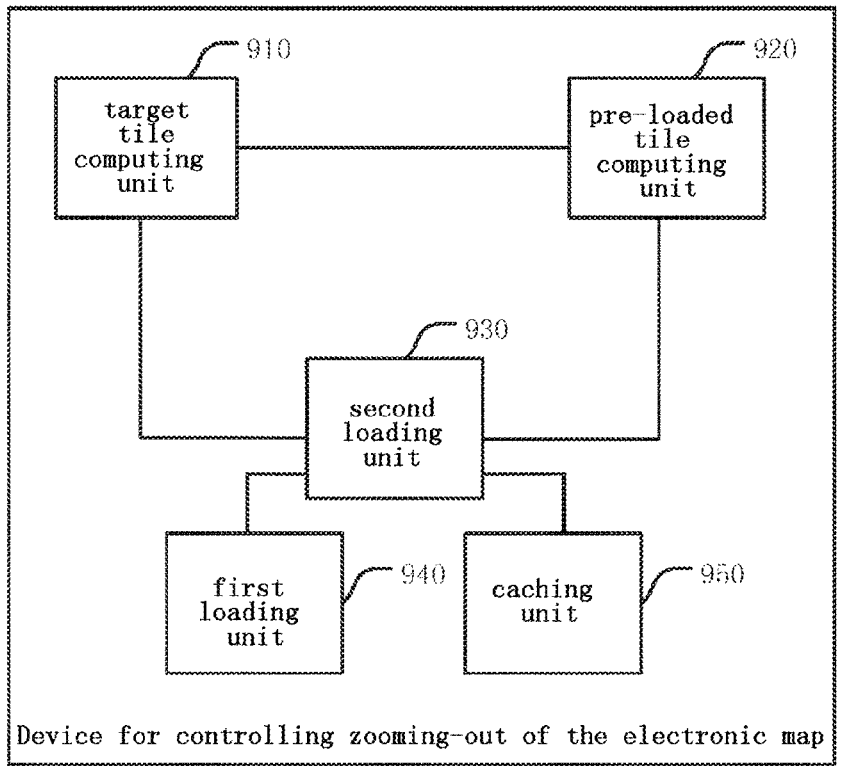
FIG. 9 illustrates a block diagram of a device for controlling zooming-out of an electronic map according to an embodiment of the present invention.

FIG. 9 illustrates a block diagram of a device for controlling zooming-out of an electronic map according to an embodiment of the present invention. The device comprises a target tile computing unit 910, a pre-loaded tile computing unit 920, a second loading unit 930, and a first loading unit 940.

The target tile computing unit 910 configured to determine a target display level to be reached via zooming out when receiving an instruction of zooming out a map, and search out a plurality of target tiles that need to be displayed in a target display level, wherein the target display level is higher than a current display level. A first loading unit 940 configured to load and display the currently displayed tiles by zooming out according to a level difference between the current display level and the target display level. Specifically, the first loading unit 940 loads and displays the currently displayed tiles by zooming out according to a level difference between the current display level and the target display level, comprising: displaying a transverse width and a longitudinal height of the currently displayed tile by zooming out to $1/p$, wherein $p=2^q$, q is a natural number, indicating a level difference between the target display level and the current display level.

The pre-loaded tile computing unit 920 configured to select a pre-loaded display level and search out pre-loaded tiles that need to be loaded at an edge region in the pre-loaded display level. In the present embodiment, the pre-loaded tile computing unit 920 configured to select a pre-loaded display level higher than the target display level. The map scope represented by the pre-loaded tile covers a map scope represented by a plurality of target tiles other than the map scope represented by the currently displayed tiles, i.e., a zoomed-out complete map scope that needs to be displayed in the display region minus the zoomed-out map scope represented by the current display tile or the "edge region" indicated above; besides, the geographical area corresponding to respective pre-loaded tiles is n times of the geographical area corresponding to respective target tiles, $n=4^k$, k is a natural number, indicating a level difference between the pre-loaded display level and the target display level.

The second loading unit 930 configured to acquire the pre-loaded tiles and the target tiles in an order of priority, load and display the pre-loaded tiles by zooming in according to a level difference between the pre-loaded display level and the target display level; and after acquiring the target tiles, load and display the target tiles so as to replace the zoomed-out currently displayed tiles and the zoomed-in pre-loaded tiles at corresponding positions.

In the present embodiment, the second loading unit 930 configured to display a transverse width and a longitudinal heights of respective pre-loaded tiles by zooming in m times, wherein $m=2^k$, k is a natural number, indicating a level difference between the pre-loaded display level and the target display level.

In the present embodiment, the second loading unit 930 increases transparency of zoomed-out currently displayed tiles and zoomed-in pre-loaded tiles while loading the target tiles. In other words, the second loading unit 930 makes the zoomed-out currently displayed tiles and zoomed-in pre-loaded tiles gradually transparent when loading the target tiles. Further, when loading the target tiles is completed, the second loading unit 930 removes the zoomed-out currently displayed tiles and zoomed-in pre-loaded tiles and displays the target tiles. Specifically, when a plurality of target tiles corresponding to one zoomed-out currently displayed tile and one zoomed-in pre-loaded tile are completely loaded, the second loading unit 930 removes the zoomed-out currently displayed tile or zoomed-in pre-loaded tile, while displaying the plurality of completely loaded target tiles; in this way, the electronic map becomes clearer.

In the present embodiment, the target tile computing unit 910 configured to obtain pixel coordinates of a zoomed-out central point by converting according to geographical position coordinates of the zoomed-out central point of the visual region of the map and the target display level of the map; obtain a pixel size of a single target tile that needs to be displayed based on the target display level of the map; obtain pixel coordinates of two opposite apexes of the visual region of the map according to the pixel size of the visual region of the map and the pixel coordinates of the zoomed-out central point; and obtain a target tile within the visual region according to the pixel coordinates of two opposite apexes of the visual region of the map and the pixel size of the single target tile that needs to be displayed.

In the present embodiment, the method of the target tile computing unit 910 to obtain target tiles of the visual region according to the pixel coordinates of two opposite apexes of the visual region of the map and the pixel size of the single target tile that needs to be displayed specifically comprises:

by obtaining transverse index numbers and longitudinal index numbers of the target tiles where two opposite apexes are located, and selecting target tiles whose transverse index numbers are located between the transverse index numbers of the target tiles where two opposite apexes are located and whose longitudinal index numbers are located between the longitudinal index numbers of the target tiles where the two opposite apexes are located, obtaining target tiles in the visual region of the map.

Wherein, the target tile computing unit 910 obtains a transverse coordinate difference and a longitudinal coordinate difference by subtracting pixel coordinates of a origin point of the map from the pixel coordinates of each of the apexes, obtains the transverse index number by dividing the transverse coordinate difference by the width of a single target tile, and obtains a longitudinal index number by dividing the longitudinal coordinate difference by the height of the single target tile.

Preferably, the device further comprises a caching unit 950.

The caching unit 950 configured to set a local cache; and save displayed tiles in the local cache.

Further, when the displayed tiles are saved by the caching unit 950 in the local cache, if capacity of the local cache is not enough, the caching unit 950 removes the least recently used tiles from the local cache.

Further, the second loading unit 930 of the present embodiment configured to judge whether the pre-loaded tiles and the target tiles are in the local cache; if yes, read the pre-loaded tiles and the target tiles from the local cache; if not, download the pre-loaded tiles and the target tiles from the server. By acquiring the tiles in the cache in priority, the loading speed can be enhanced.

Figure 10:
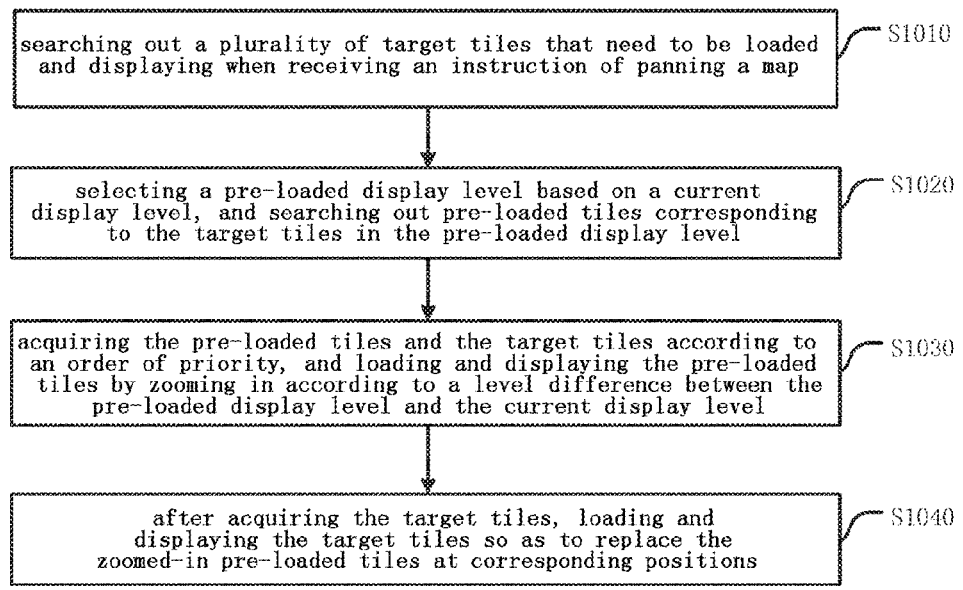
FIG. 10 illustrates a flow diagram of a method for panning of an electronic map according to an embodiment of the present invention.

FIG. 10 illustrates a flow diagram of a method for panning of an electronic map according to an embodiment of the present invention. The method comprises steps S1010 to S1040:

S1010: searching out a plurality of target tiles that need to be loaded and displayed when receiving an instruction of panning a map.

S1020: selecting a pre-loaded display level based on a current display level, and searching out pre-loaded tiles corresponding to the target tiles in the pre-loaded display level.

In the present embodiment, the pre-loaded display level is higher than the current display level. The map scope represented by the pre-loaded tiles includes the map scope represented by a plurality of target tiles, and the geographical area corresponding to respective pre-loaded tiles is n times of the geographical area corresponding to respective target tiles, $n=4^k$, k is a natural number and indicating a level difference between the pre-loaded display level and the target display level.

In the present embodiment, because each pre-loaded level tile corresponds to a plurality of target tiles, the map scope represented by the pre-loaded level tire is possibly larger than the map scope represented by multiple target tiles.

S1030: acquiring the pre-loaded tiles and the target tiles according to an order of priority, and loading and displaying the pre-loaded tiles by zooming in according to a level difference between the pre-loaded display level and the current display level. By first displaying fussy low-definition zoomed-in pre-loaded tiles, the loading speed is accelerated, and the probability of displaying blank tiles on the electronic map is reduced.

In the present embodiment, loading and displaying the pre-loaded tiles by zooming in according to a level difference between the pre-loaded display level and the current display level, comprising: displaying a transverse width and a longitudinal height of respective pre-loaded tiles by zooming in m times, wherein $m=2^k$, k is a natural number, indicating a level difference between the pre-loaded display level and the target display level.

S1040: after acquiring the target tiles, loading and displaying the target tiles so as to replace the zoomed-in pre-loaded tiles at corresponding positions. By replacing the zoomed-in pre-loaded tiles at corresponding positions with clear target tiles, the map is clearly displayed, and a display effect of displaying the map from fussiness to clarity is achieved.

By integrating steps S1010, S1020, S1030, and S1040, by selecting a pre-loaded display level and loading and displaying the pre-loaded tiles by zooming in, the present embodiment quickly displays fussy pre-loaded tiles and reduces the probability of displaying blank tiles in the electronic map.

By performing steps S1020 and step S1030, the present embodiment can select a pre-loaded display level higher than the target display level and displaying the zoomed-in pre-loaded tiles in the pre-loaded display level. By repetitively performing step S1020 and step S1030, a plurality of pre-loaded display levels higher than the target display level can also be selected and the zoomed-in pre-loaded tiles in the plurality of pre-loaded display levels may be displayed. In specific implementations, zoomed-in pre-loaded tiles in higher pre-loaded display levels may be first displayed, and then zoomed in pre-loaded tiles in lower pre-loaded display levels are displayed, which can likewise achieve the display effect from fussiness to definition.

Further, the method further comprises: setting a local cache; saving the displayed tiles in the local cache, as indicated above. More specifically, the method further comprises: when saving the displayed tiles in the local cache, if capacity of the local cache is not enough, the least recently used tiles are removed from the local cache.

Preferably, the method of selecting a pre-loaded display level in step S1020 includes selecting a plurality of levels higher than the target display level, and selecting a pre-loaded display level from the various levels; specifically, judging that tiles corresponding to the target tiles in various levels are in the cache or need to be downloaded from the server, and selecting a level with a least number of tiles that need to be downloaded from the server as the pre-loaded display level, thereby accelerating the speed of downloading the pre-loaded tiles from the server; further, if the numbers of tiles that need to be downloaded from the server are identical, a higher level is selected in priority as the pre-loaded display level, thereby reducing the number of pre-loaded tiles that need to be processed so as to further accelerate the processing speed.

In the present embodiment, the acquiring the pre-loaded tiles and the target tiles according to an order of priority in step S1030 above specifically comprises: judging whether the pre-loaded tiles and the target tiles are in the local cache; if yes, reading the pre-loaded tiles and the target tiles from the local cache; if not, downloading the pre-loaded tiles and the target tiles from the server. By acquiring the tiles in the cache in priority, the loading speed can be enhanced.

Step S1040 of the present embodiment specifically comprises steps of:

S1041: increasing transparency of the zoomed-in pre-loaded tiles while loading the target tiles. In other words, when loading the target tiles, the zoomed-in pre-loaded tiles gradually become transparent.

S1042: when loading the target tiles is completed, removing the zoomed-in pre-loaded tiles and displaying the target tiles. Specifically, when a plurality of target tiles corresponding to one zoomed-in pre-loaded tiles are completely loaded, the zoomed-in pre-loaded tiles are removed, while the plurality of completely loaded target tiles are displayed; therefore, the electronic map becomes clearer.

In the present embodiment, different rendering mechanisms are provided based on different browser versions. The preferred rendering mechanisms as provided refer to the detailed depiction of FIG. 4.

Figure 11:
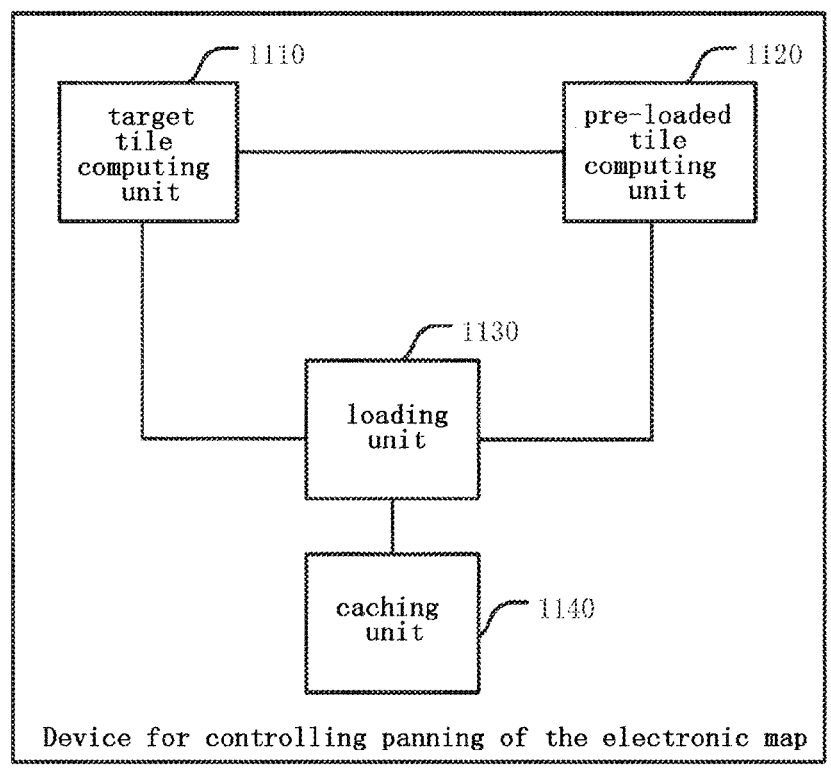
FIG. 11 illustrates a block diagram of a device for panning of an electronic map according to an embodiment of the present invention.

FIG. 11 illustrates a block diagram of a device for panning of an electronic map according to an embodiment of the present invention. The device comprises a target tile computing unit 1110, a pre-loaded tile computing unit 1120, and a loading unit 1130.

The target tile computing unit 1110 configured to search out a plurality of target tiles that need to be loaded and displayed when receiving an instruction of panning a map.

The pre-loaded tile computing unit 1120 configured to select a pre-loaded display level based on a current display level, and search out pre-loaded tiles corresponding to the target tiles in the pre-loaded display level.

In the present embodiment, the pre-loaded tile computing unit 1120 configured to select a pre-loaded display level higher than the current display level. The map scope represented by the pre-loaded level tile includes the map scope represented by a plurality of target tiles, and the geographical area corresponding to respective pre-loaded tiles is n times of the geographical area corresponding to respective target tiles, $n=4^k$, k is a natural number and indicating a level difference between the pre-loaded display level and the current display level.

In the present embodiment, because each pre-loaded level tile corresponds to a plurality of target tiles, the map scope represented by the pre-loaded tiles is possibly larger than the map scope represented by multiple target tiles.

The loading unit 1130 configured to acquire the pre-loaded tiles and the target tiles according to an order of priority, and load and display the pre-loaded tiles by zooming in according to a level difference between the pre-loaded display level and the current display level; and after acquiring the target tiles, load and display the target tiles so as to replace the zoomed-in pre-loaded tiles at corresponding positions. By first displaying fussy zoomed-in pre-loaded tiles, the loading speed is accelerated, and the probability of displaying blank tiles on the electronic map is reduced. By replacing corresponding fussy zoomed-in pre-loaded tiles with clear target tiles, the map is clearly displayed, and a display effect of displaying the map from fussiness to clarity is achieved.

In the present embodiment, the loading unit 1130 configured to display a transverse width and a longitudinal height of respective pre-loaded tiles by zooming in m times, wherein $m=2^k$, k is a natural number, indicating a level difference between the pre-loaded display level and the target display level.

In the present embodiment, the loading unit 1130 configured to increase transparency of the zoomed-in pre-loaded tiles while loading the target tiles, and when loading the target tiles is completed, remove the zoomed-in pre-loaded tiles and display the target tiles.

Preferably, the device further comprises a caching unit 1140.

The caching unit 1140 configured to set a local cache; and save displayed tiles in the local cache. By creating the local cache using the caching unit 1140, the tile request frequency is controlled.

Further, when the displayed tiles are saved by the caching unit 1140 in the local cache, if capacity of the local cache is not enough, the caching unit 1140 removes tiles the least recently used tiles from the local cache.

Further, the loading unit 1130 of the present embodiment configured to judge whether the pre-loaded tiles and the target tiles are in the local cache; if yes, read the pre-loaded tiles and the target tiles from the local cache; if not, download the pre-loaded tiles and the target tiles from the server. By acquiring the tiles in the cache in priority, the loading speed can be enhanced.

Figure 12:
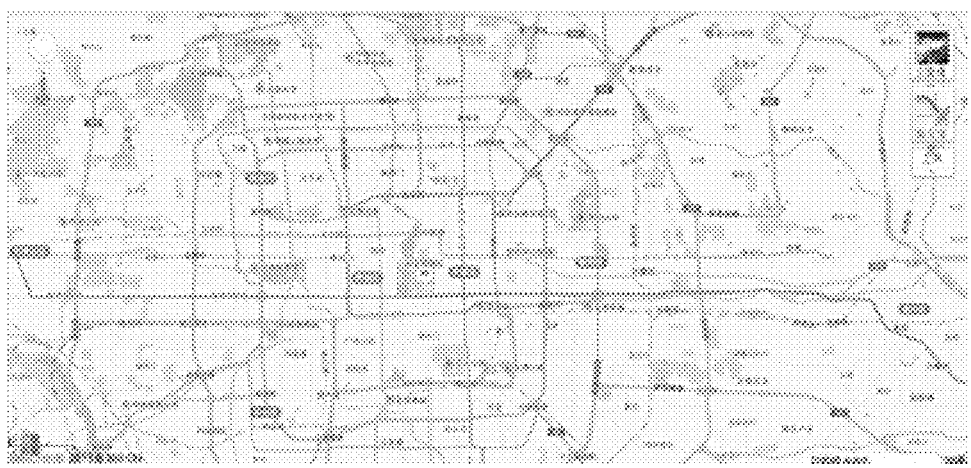
FIG. 12 illustrates a schematic diagram of an electronic map client implemented according to the present invention.

FIG. 12 illustrates a schematic diagram of an electronic map client implemented according to the present invention. When the electronic map client performs operations like zooming in, zooming out, and panning according the a user's instruction, the probability of existence of blanks in the electronic map window is small; moreover, the electronic map exhibits a displaying process from fussiness to clarity, which makes the switching between map levels inconspicuous.

Various component embodiments of the present invention may be implemented by hardware or by software modules running on one or more processors, or implemented by their combination. Those skilled in the art should understand that in practice, a microprocessor or a digital signal processor (DSP) may be used to implement some or all functions of some or all components of a device for controlling zooming-in of an electronic map, a device for controlling zooming-out of an electronic map, a device for controlling panning of an electronic map, a device for computing tiles within a visual region of an electronic map, and a device for processing an electronic map tile request queue. The present invention may also be implemented a device or device program (e.g., a computer program and a computer program product) for implementing a part or all of the methods described here. Such a problem for implementing the present invention may be stored on a computer readable medium, or may have a form of one or more signals. Such signals may be downloaded from an Internet website, or provided on a carrier signal, or provided in any other form.

Figure 13:
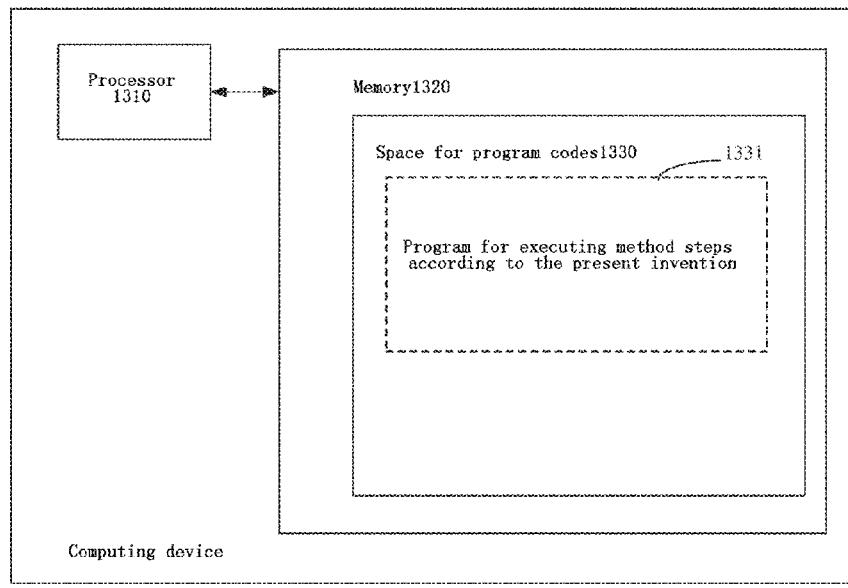
FIG. 13 illustrates a block diagram of a computing device for implementing the methods according to the present invention.
Figure 14:
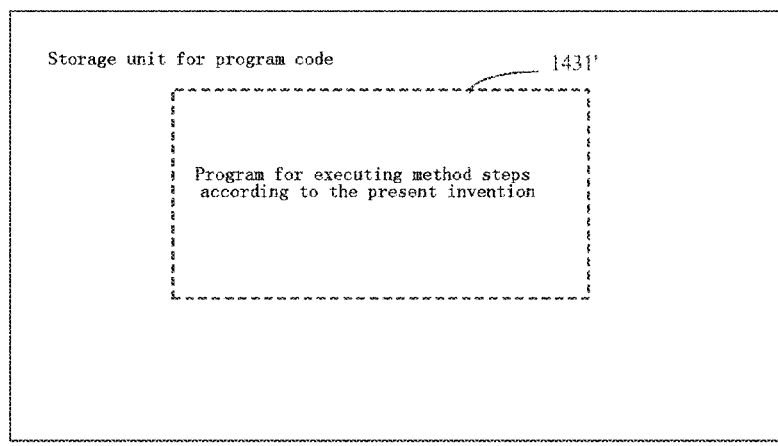
FIG. 14 illustrates a storage unit for maintaining or carrying program code that implements methods according to the present invention.

For example, FIG. 13 illustrates a schematic diagram of a computing device for controlling an electronic map, the computing device being implemented for executing the present invention, e.g., a block diagram of a terminal device or an application server. The computing device traditionally comprises a processor 1310 and a computer program product or a computer readable medium in a form of memory 1320. The memory 1320 may be an electronic storage such as a flash memory, an EEPROM (Electrically Erasable Programmable Read-Only Memory), an EPROM, a hard disk or a ROM. The memory 1320 has a storage space 1330 with program codes 1331 for executing any method steps in the method. For example, the storage space 1330 for program code may include various program codes 1331 for implementing respective steps in the methods above, respectively. These program codes may be read out from one or more computer program codes or written into one or more such computer program codes. These computer program products include program code carriers such as a hard disk, a compact disk (CD), a memory card or a floppy disk and the like. Such computer program product is generally a portable or fixed storage unit as depicted with reference to FIG. 14. The storage unit may have a storage segment, a storage space or the like arranged in a similar way to the memory 1420 in the computing device of FIG. 13. The program code may, for example, be compressed in any appropriate form. Generally, the storage unit includes a computer readable code 1431', i.e., codes that may be read by a processor such as the processor 1310. These codes, when being executed by the server, cause the server to execute various steps of the methods depicted above.

The "one embodiment," "embodiment" or "one or more embodiments" herein means that a specific feature, structure or characteristic described in conjunction with an embodiment is included in at least one embodiment of the present invention. In addition, the exemplary expression "in one embodiment" does not necessarily mean the same embodiment.

The specification provided herein illustrates considerable specific details. However, it can be understood that the embodiment of the present invention may be practiced without these specific details. In some instances, known methods, structures and technologies are not illustrated in detail so as to not to blur the understanding of the present invention.

It should be noted that the embodiments above are intended to illustrate the present invention, not intended to limit the present invention; moreover, without departing from the scope of the appended claims, those skilled in the art may design an alternative embodiments. In the claims, no reference numerals included within parentheses should constitute a limitation to the claims. The word "comprise" does not exclude elements or steps not stated in the claims. Wording like "a" or "an" before an element does not exclude existence of a plurality of such elements. The present invention may be implemented by virtue of hardware including a plurality of different elements and an appropriately programmed computer. In a device claim listing several means, several of such means may be embodied through the same hardware item. Use of words like first, second, and third and etc. does not indicate any sequence. These words may be explained as names.

Besides, it should also be noted that languages used in the specification are selected mainly for purposes of readability of teaching, not for interpreting or limiting the subject matter of the present invention. Therefore, without departing from the scope and spirit of the appended claims, many modifications and alternations are obvious to a person of normal skill in the art. For the scope of the present invention, the disclosure of the present invention is illustrative, not limitative. The scope of the present invention is limited by the appended claims.

What is claimed is:

1. A device for controlling panning of an electronic map, the device comprising:
    at least a processor; and
    at least a memory communicatively coupled to the at least a processor, the at least a memory bearing processor-executable instructions that upon execution by the at least a processor cause the device to perform at least the following operations:
    searching out a plurality of target tiles that need to be loaded and displayed when receiving an instruction of panning a map;
    selecting a pre-loaded display level based on a current display level, and searching out pre-loaded tiles corresponding to the target tiles in the pre-loaded display level;
    acquiring the pre-loaded tiles and the target tiles according to an order of priority, and loading and displaying the pre-loaded tiles by zooming in according to a level difference between the pre-loaded display level and the current display level; and
    after acquiring the target tiles, loading and displaying the target tiles so as to replace the zoomed-in pre-loaded tiles at corresponding positions, wherein the searching out a plurality of target tiles that need to be loaded and displayed comprises:
    according to geographical position coordinates of a central point of a visual region of the map and the current display level of the map, obtaining pixel coordinates of the central point by converting;
    obtaining a pixel size of a single tile in the current display level based on the current display level of the map;
    obtaining, according to the pixel size of the visual region of the map and the pixel coordinates of the central point, pixel coordinates of two opposite apexes of the visual region of the map; and
    obtaining serial numbers of tiles in the visual region according to the pixel coordinates of the two opposite apexes of the visual region of the map and the pixel size of the single tile in the current display level.

2. A method for controlling panning of an electronic map, the method comprising:
    searching out a plurality of target tiles that need to be loaded and displayed when receiving an instruction of panning a map;
    selecting a pre-loaded display level based on a current display level, and searching out pre-loaded tiles corresponding to the target tiles in the pre-loaded display level;
    acquiring the pre-loaded tiles and the target tiles according to an order of priority, and loading and displaying the pre-loaded tiles by zooming in according to a level difference between the pre-loaded display level and the current display level; and
    after acquiring the target tiles, loading and displaying the target tiles so as to replace the zoomed-in pre-loaded tiles at corresponding positions, wherein searching out a plurality of target tiles that need to be loaded and displayed comprises:
    according to geographical position coordinates of a central point of a visual region of the map and the current display level of the map, obtaining pixel coordinates of the central point by converting;
    obtaining a pixel size of a single tile in the current display level based on the current display level of the map;
    obtaining, according to the pixel size of the visual region of the map and the pixel coordinates of the central point, pixel coordinates of two opposite apexes of the visual region of the map; and
    obtaining serial numbers of tiles in the visual region according to the pixel coordinates of the two opposite apexes of the visual region of the map and the pixel size of the single tile in the current display level.

3. The method according to claim 2, wherein
    the pre-loaded display level is higher than the current display level;
    a map scope represented by the pre-loaded tiles covers a map scope represented by a plurality of target tiles, and a geographical area corresponding to respective pre-loaded tiles is n times of a geographical area corresponding to respective target tiles, $n=4^k$, k is a natural number and indicating a level difference between the pre-loaded display level and the current display level.

4. The method according to claim 2, wherein the loading and displaying the pre-loaded tiles by zooming in according to a level difference between the pre-loaded display level and the current display level, comprising:

displaying a transverse width and a longitudinal height of respective pre-loaded tiles by zooming in m times, wherein m=$2^k$, k is a natural number, indicating a level difference between the pre-loaded display level and the current display level.

5. The method according to claim 2, wherein the method further comprises:

setting a local cache;

saving displayed tiles in the local cache.

6. The method according to claim 5, wherein the method further comprises:

when saving the displayed tiles in the local cache, if capacity of the local cache is not enough, removing the least recently used tiles from the local cache.

7. The method according to claim 2, wherein the acquiring the pre-loaded tiles and the target tiles according to an order of priority comprises:

judging whether the pre-loaded tiles and the target tiles are in the local cache;

if yes, reading the pre-loaded tiles and the target tiles from the local cache;

if not, downloading the pre-loaded tiles and the target tiles from a server.

8. The method according to claim 2, wherein the loading and displaying the target tiles so as to replace the zoomed in pre-loaded tiles at corresponding positions specifically comprises:

increasing transparency of zoomed in pre-loaded tiles while loading the target tiles;

when loading the target tiles is completed, removing the zoomed-in pre-loaded tiles and displaying the target tiles.

9. The method according to claim 2, wherein the obtaining serial numbers of tiles in the visual region according to the pixel coordinates of two opposite apexes of the visual region of the map and the pixel size of the single tile in the current display level comprises:

obtaining transverse index numbers and longitudinal index numbers of tiles where the two opposite apexes are located;

selecting transverse index numbers between the transverse index numbers of the tiles where the two opposite apexes are located and longitudinal index numbers between the longitudinal index numbers of the tiles where two opposite apexes are located, to obtain serial numbers of tiles in the visual region of the map;

wherein the obtaining transverse index numbers and longitudinal index numbers of the tiles where the two opposite apexes are located specifically comprises:

obtaining a transverse coordinate difference and a longitudinal coordinate difference by subtracting pixel coordinates of a origin point of the map from the pixel coordinates of each of the apexes, obtaining the transverse index number by dividing the transverse coordinate difference by the width of a single target tile, and obtaining the longitudinal index number by dividing the longitudinal coordinate difference by the height of the single target tile.

10. The method according to claim 2, wherein searching out a plurality of target tiles that need to be loaded and displayed further comprises:

computing serial numbers of pre-loaded tiles corresponding to the visual region in at least one pre-loaded level according to geographical position coordinates of the central point of the visual region of the map and a pre-loaded level; or performing a division and rounding operation or a multiplication operation to the serial numbers of the tiles within the visual region of the map in a current display level according to a level difference between a pre-loaded level and the current display level to compute serial numbers of pre-loaded tiles corresponding to the tiles within the visual region in at least one pre-loaded level, wherein the preloaded level refers to at least one level whose level difference from the current display level is within a set range.

11. The method according to claim 10, wherein the computing serial numbers of pre-loaded tiles corresponding to the visual region in at least one pre-loaded level according to geographical position coordinates of the central point of the visual region of the map and a pre-loaded level specifically comprises:

according to the geographical position coordinates of the central point of the visual region of the map and the pre-loaded level, obtaining the pixel coordinates of the central point by converting;

obtaining a pixel size of a single tile in the pre-loaded level based on the pre-loaded level of the map;

obtaining pixel coordinates of two opposite apexes of the visual region of the map based on the pixel size of the visual region of the map and the pixel coordinates of the central point;

obtaining the serial numbers of the pre-loaded tiles corresponding to the visual region in the pre-loaded level according to the pixel coordinates of the two opposite apexes of the visual region of the map and the pixel size of the single tile in the pre-loaded level.

12. The method according to claim 10, wherein the performing a division and rounding operation or a multiplication operation to the serial numbers within a visual region of the map under the current display level according to a level difference between a pre-loaded level and a current display level comprises:

if the pre-loaded level is higher than the current display level, dividing the transverse index numbers and the longitudinal index numbers of the tiles within the visual region of the map in the current display level by m and rounding, respectively, wherein m=$2^k$, and k is a natural number, indicating a level difference between the pre-loaded level and the current display level;

if the pre-loaded level is lower than the current display level, multiplying the transverse index numbers and the longitudinal index numbers of the tiles within the visual region of the map in the current display level by p, respectively, obtaining p neighboring index numbers according to a multiplication operation result, wherein p=$2^q$, q is a natural number, indicating a level difference between the current level and the pie-loaded level.

13. The method according to claim 2, wherein the two opposite apexes of the visual region of the map include a left upper apex and a right lower apex of the visual region of the map, or the right upper apex and the left lower apex of the visual region of the map.

14. The method according to claim 2, wherein the method further comprises:

upon receiving a map zooming instruction, obtaining pixel coordinates of a zooming focal center of the map by converting according to geographical position coordinates of the zooming focal center and a target display level after the map is zoomed;

obtaining a pixel size of a single tile in the target display level based on the target display level;

obtaining pixel coordinates of two opposite apexes of the visual region after map zooming based on the pixel size of the visual region of the map and the pixel coordinates of the zooming focal center; and obtaining serial numbers of the tiles in the visual region after map zooming based on the pixel coordinates of the two opposite apexes of the visual region after map zooming and the pixel size of the single tile in the target display level.

15. A non-transitory computer readable medium having instructions stored thereon, when executed by at least one processor, cause the at least one processor to perform operations for controlling panning of an electronic map, the operations comprising:

searching out a plurality of target tiles that need to be loaded and displayed when receiving an instruction of panning a map;

selecting a pre-loaded display level based on a current display level, and searching out pre-loaded tiles corresponding to the target tiles in the pre-loaded display level;

acquiring the pre-loaded tiles and the target tiles according to an order of priority, and loading and displaying the pre-loaded tiles by zooming in according to a level difference between the pre-loaded display level and the current display level; and after acquiring the target tiles, loading and displaying the target tiles so as to replace the zoomed-in pre-loaded tiles at corresponding positions, wherein searching out a plurality of target tiles that need to be loaded and displayed comprises:

according to geographical position coordinates of a central point of a visual region of the map and the current display level of the map, obtaining pixel coordinates of the central point by converting;

obtaining a pixel size of a single tile in the current display level based on the current display level of the map;

obtaining, according to the pixel size of the visual region of the map and the pixel coordinates of the central point, pixel coordinates of two opposite apexes of the visual region of the map; and obtaining serial numbers of tiles in the visual region according to the pixel coordinates of the two opposite apexes of the visual region of the map and the pixel size of the single tile in the current display level.

* * * * *